United States Patent
Petrus et al.

(10) Patent No.: US 6,690,747 B2
(45) Date of Patent: *Feb. 10, 2004

(54) METHOD FOR REFERENCE SIGNAL GENERATION IN THE PRESENCE OF FREQUENCY OFFSETS IN A COMMUNICATIONS STATION WITH SPATIAL PROCESSING

(75) Inventors: Paul Petrus, Sunnyvale, CA (US); Alain M. Chiodini, Mountain View, CA (US); Mitchell D Trott, Mountain View, CA (US); David M. Parish, Los Altos, CA (US); Michael Youssefmir, Palo Alto, CA (US); Dov Rosenfeld, Oakland, CA (US)

(73) Assignee: ArrayComm, Inc., San Jose, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 09/877,807

(22) Filed: Jun. 6, 2001

(65) Prior Publication Data

US 2001/0031022 A1 Oct. 18, 2001

Related U.S. Application Data

(63) Continuation of application No. 09/153,110, filed on Sep. 15, 1998, which is a continuation-in-part of application No. 08/729,390, filed on Oct. 11, 1996, now Pat. No. 5,909,470.

(51) Int. Cl.$^7$ .............................................. H04L 27/14

(52) U.S. Cl. ...................... 375/324; 375/326; 370/310; 343/893

(58) Field of Search ................................ 375/324, 326, 375/130; 370/310; 343/879, 893; 342/368, 378

(56) References Cited

U.S. PATENT DOCUMENTS

| | | | |
|---|---|---|---|
| 3,704,465 | A | 11/1972 | Masak et al. |
| 3,774,209 | A | 11/1973 | Fleming et al. |

(List continued on next page.)

FOREIGN PATENT DOCUMENTS

| | | |
|---|---|---|
| EP | 0 639 035 A1 | 2/1995 |
| EP | 0 665 665 A1 | 8/1995 |

(List continued on next page.)

OTHER PUBLICATIONS

Ottersten, B., "Array Processing for Wireless Communications," Proc. 8th IEEE Signal Processing Workshop on Statistical Signal and Array Proc., Jun. 1996, pp. 466–473.

(List continued on next page.)

*Primary Examiner*—Temesghen Ghebretinsae
(74) *Attorney, Agent, or Firm*—Blakely, Sokoloff, Taylor & Zafman LLP

(57) ABSTRACT

A method for generating a reference signal from a modulated signal transmitted to a communications station that includes an array of antenna elements and spatial processing means including: separating from the signals received at the antenna elements a copy signal corresponding to the signal transmitted by a particular remote station using an initial spatial weight vector corresponding to the particular remote station; determining from the terminal copy signal a reference signal having substantially the same frequency offset and time alignment as the received antenna signals; and computing a new spatial weight vector by optimizing a cost function, the cost function using the received antenna signals and the reference signal. For demodulation, the method further includes extracting the symbols of the modulated signal.

96 Claims, 8 Drawing Sheets

U.S. PATENT DOCUMENTS

| | | |
|---|---|---|
| 3,798,645 A | 3/1974 | Baurle et al. |
| 3,852,749 A | 12/1974 | Kohler |
| 3,946,385 A | 3/1976 | Ewen |
| 4,005,379 A | 1/1977 | Lerner |
| 4,035,746 A | 7/1977 | Covington, Jr. |
| 4,085,319 A | 4/1978 | Deitz et al. |
| 4,128,740 A | 12/1978 | Graziano |
| 4,263,568 A | 4/1981 | Nemit |
| 4,316,191 A | 2/1982 | Sawatari et al. |
| 4,375,622 A | 3/1983 | Hollingsworth et al. |
| 4,434,505 A | 2/1984 | Gutleber |
| 4,475,010 A | 10/1984 | Huensch et al. |
| 4,626,859 A | 12/1986 | Stansfield |
| 4,639,732 A | 1/1987 | Acoraci et al. |
| 4,639,914 A | 1/1987 | Winters |
| 4,658,096 A | 4/1987 | West, Jr. et al. |
| 4,737,794 A | 4/1988 | Jones |
| 4,737,975 A | 4/1988 | Shafer |
| 4,742,356 A | 5/1988 | Kuipers |
| 4,750,147 A | 6/1988 | Roy, III et al. |
| 4,775,997 A | 10/1988 | West, Jr. et al. |
| 4,796,291 A | 1/1989 | Makino |
| 4,827,395 A | 5/1989 | Anders et al. |
| 4,829,554 A | 5/1989 | Barnes et al. |
| 4,837,800 A | 6/1989 | Freeburg et al. |
| 4,855,748 A | 8/1989 | Brandao et al. |
| 4,910,794 A | 3/1990 | Mahany |
| 4,922,517 A | 5/1990 | West, Jr. et al. |
| 4,926,186 A | 5/1990 | Kelly et al. |
| 4,940,963 A | 7/1990 | Gutman et al. |
| 4,947,452 A | 8/1990 | Hattori et al. |
| 4,955,082 A | 9/1990 | Hattori et al. |
| 4,965,732 A | 10/1990 | Roy, III et al. |
| 4,965,849 A | 10/1990 | Kunihiro |
| 4,965,850 A | 10/1990 | Schloemer |
| 4,972,151 A | 11/1990 | Rosen |
| 4,989,204 A | 1/1991 | Shimizu et al. |
| 5,041,833 A | 8/1991 | Weinberg |
| 5,052,799 A | 10/1991 | Sasser et al. |
| 5,093,924 A | 3/1992 | Toshiyuki et al. |
| 5,103,459 A | 4/1992 | Gilhousen et al. |
| 5,109,535 A | 4/1992 | Kume et al. |
| 5,124,697 A | 6/1992 | Moore |
| 5,142,253 A | 8/1992 | Mallavarpu et al. |
| 5,159,593 A | 10/1992 | D'Amico et al. |
| 5,255,210 A | 10/1993 | Gardner et al. |
| 5,260,968 A | 11/1993 | Gardner et al. |
| 5,262,789 A | 11/1993 | Silverstein |
| 5,274,844 A | 12/1993 | Harrison et al. |
| 5,276,907 A | 1/1994 | Meidan |
| 5,283,540 A | 2/1994 | Myer |
| 5,299,148 A | 3/1994 | Gardner et al. |
| 5,335,249 A | 8/1994 | Krueger et al. |
| 5,345,596 A | 9/1994 | Buchenhorner et al. |
| 5,361,303 A | 11/1994 | Eatwell |
| 5,367,559 A | 11/1994 | Kay et al. |
| 5,379,320 A | 1/1995 | Fernandes et al. |
| 5,387,915 A | 2/1995 | Moussa et al. |
| 5,423,072 A | 6/1995 | Iwashita et al. |
| 5,430,760 A | 7/1995 | Dent |
| 5,440,281 A | 8/1995 | Wey et al. |
| 5,448,621 A | 9/1995 | Knudsen |
| 5,457,812 A | 10/1995 | Siira et al. |
| 5,465,399 A | 11/1995 | Oberholtzer et al. |
| 5,471,647 A | 11/1995 | Gerlach et al. |
| 5,475,864 A | 12/1995 | Hamabe |
| 5,475,868 A | 12/1995 | Duque-Anton et al. |
| 5,497,505 A | 3/1996 | Koohgoli et al. |
| 5,515,378 A | 5/1996 | Roy, III et al. |
| 5,530,449 A | 6/1996 | Wachs et al. |
| 5,530,917 A | 6/1996 | Andersson et al. |
| 5,532,706 A | 7/1996 | Reinhardt et al. |
| 5,537,438 A | 7/1996 | Mourot et al. |
| 5,543,801 A | 8/1996 | Shawyer |
| 5,546,090 A | 8/1996 | Roy, III et al. |
| 5,548,813 A | 8/1996 | Charas et al. |
| 5,553,074 A | 9/1996 | Acampora |
| 5,555,445 A | 9/1996 | Booth |
| 5,557,657 A | 9/1996 | Barnett |
| 5,565,873 A | 10/1996 | Dean |
| 5,566,209 A | 10/1996 | Forssen et al. |
| 5,574,977 A | 11/1996 | Joseph |
| 5,576,717 A | 11/1996 | Searle et al. |
| 5,592,490 A | 1/1997 | Barratt et al. |
| 5,596,625 A | 1/1997 | LeBlanc |
| 5,603,082 A | 2/1997 | Hamabe |
| 5,603,089 A | 2/1997 | Searle et al. |
| 5,606,729 A | 2/1997 | D'Amico et al. |
| 5,615,409 A | 3/1997 | Forssen et al. |
| 5,619,503 A | 4/1997 | Dent |
| 5,621,752 A | 4/1997 | Antonio et al. |
| 5,625,880 A | 4/1997 | Goldburg |
| 5,625,885 A | 4/1997 | Nakazawa et al. |
| 5,638,375 A | 6/1997 | Dettro et al. |
| 5,642,353 A | 6/1997 | Roy, III |
| 5,649,287 A | 7/1997 | Forssen et al. |
| 5,673,291 A | 9/1997 | Dent |
| 5,675,581 A | 10/1997 | Soliman |
| 5,678,188 A | 10/1997 | Hisamura |
| 5,684,794 A | 11/1997 | Lopez et al. |
| 5,684,836 A | 11/1997 | Nagayasu et al. |
| 5,689,219 A | 11/1997 | Piirainen |
| 5,689,502 A | 11/1997 | Scott |
| 5,694,416 A | 12/1997 | Johnson |
| 5,697,066 A | 12/1997 | Acampora |
| 5,708,971 A | 1/1998 | Dent |
| 5,726,978 A | 3/1998 | Frodigh et al. |
| 5,732,076 A | 3/1998 | Ketseoglou et al. |
| 5,742,904 A | 4/1998 | Pinder et al. |
| 5,745,858 A | 4/1998 | Sato et al. |
| 5,748,676 A | 5/1998 | Mahany |
| 5,752,165 A | 5/1998 | Hokkanen |
| 5,774,461 A | 6/1998 | Hyden et al. |
| 5,809,009 A | 9/1998 | Matsuoka et al. |
| 5,809,019 A | 9/1998 | Ichihara et al. |
| 5,812,090 A | 9/1998 | Chevalier et al. |
| 5,818,918 A | 10/1998 | Fujii |
| 5,819,182 A | 10/1998 | Gardner et al. |
| 5,825,762 A | 10/1998 | Kamin, Jr. et al. |
| 5,828,658 A | 10/1998 | Ottersten et al. |
| 5,845,212 A | 12/1998 | Tanaka |
| 5,867,123 A | 2/1999 | Geyh et al. |
| 5,884,148 A | 3/1999 | Bilgic et al. |
| 5,884,178 A | 3/1999 | Ericsson et al. |
| 5,887,038 A | 3/1999 | Golden |
| 5,905,721 A | 5/1999 | Liu et al. |
| 5,909,470 A | 6/1999 | Barratt et al. |
| 5,914,946 A | 6/1999 | Avidor et al. |
| 5,930,243 A | 7/1999 | Parish et al. |
| 5,933,421 A | 8/1999 | Alamouti et al. |
| 5,955,992 A | 9/1999 | Shattil |
| 5,970,394 A | 10/1999 | Arpee et al. |
| 5,973,638 A | 10/1999 | Robbins et al. |
| 5,999,826 A | 12/1999 | Whinnett |
| 6,005,854 A | 12/1999 | Xu et al. |
| 6,009,124 A | 12/1999 | Smith et al. |
| 6,018,317 A | 1/2000 | Dogan et al. |
| 6,018,555 A | 1/2000 | Mahany |
| 6,018,643 A | 1/2000 | Golemon et al. |
| 6,023,203 A | 2/2000 | Parish |
| 6,037,898 A | 3/2000 | Parish et al. |

| | | | |
|---|---|---|---|
| 6,061,553 A | 5/2000 | Matsuoka et al. |
| 6,064,865 A | 5/2000 | Kuo et al. |
| 6,067,324 A | 5/2000 | Harrison |
| 6,108,565 A | 8/2000 | Scherzer |
| 6,122,260 A | 9/2000 | Liu et al. |
| 6,131,016 A | 10/2000 | Greenstein et al. |
| 6,141,567 A | 10/2000 | Youssefmir et al. |
| 6,154,661 A | 11/2000 | Goldburg |
| 6,185,412 B1 | 2/2001 | Pentikainen et al. |
| 6,192,256 B1 | 2/2001 | Whinnett |
| 6,219,561 B1 | 4/2001 | Raleigh |
| 6,292,664 B1 | 9/2001 | Ostrup |
| 6,337,985 B1 | 1/2002 | Roux et al. |

FOREIGN PATENT DOCUMENTS

| | | |
|---|---|---|
| EP | 0 713 261 A1 | 5/1996 |
| EP | 0 777 400 A2 | 6/1997 |
| EP | 0786914 A2 | 7/1997 |
| EP | 0841827 A | 5/1998 |
| GB | 2 237 706 A | 5/1991 |
| GB | 2 295 524 A | 5/1996 |
| GB | 2 313 261 A | 11/1997 |
| JP | 7-170548 | 4/1995 |
| WO | 95/34103 | 12/1995 |
| WO | WO 96/22662 | 7/1996 |
| WO | WO 97/02262 | 7/1996 |
| WO | WO 97/08849 | 3/1997 |
| WO | WO 98/01963 | 1/1998 |
| WO | WO 98/17037 | 4/1998 |
| WO | WO 98/17071 | 4/1998 |
| WO | 98/28864 | 7/1998 |

OTHER PUBLICATIONS

Gerd Ascheid, et al., "An All Digital Receiver Architecture for Bandwidth Efficient Transmission at High Data rates," *IEEE Transactions on Communications*, vol. 37, No. 8, Aug. 1989. pp. 804–813.

Ronald A. Iltis, et al. "A Digital DS Spread–Spectrum Receiver with Joint Channel and Doppler Shift Estimation," *IEEE Transactions on Communications*, vol. 39, No. 8, Aug. 1991. pp. 1255–1267.

Matthew w. Ganz, et al. "A Data–Derived Reference Signal Technique for Adaptive Arrays." *IEEE Transactions on Communications*, vol. 37, No. 9, Sep. 1989. pp. 975–983.

Farsakh et al., "A Real Time Downlink Channel Allocation Scheme for an SDMA Mobile Radio System," IEEE International Symposium on Personal, Indoor and Mobile Radio Communications, vol. 3, Oct. 18, 1996, pp. 1215–1220.

Farsakh et al., "Channel Allocation and Downlink Beamforming in an SDMA Mobile Radio System," PIMRC '95, Wireless: Merging onto the Information Superhighway, 6th IEEE International Symposium on Toronto, Ont., Canada, Sep. 27–29, 1995, pp. 687–691.

Gerlach et al., "Base Station Transmitter Antenna Arrays with Mobile to Base Feedback," IEEE Asilomar Conference on Signals, Systems & Computers, 1993, pp. 1432–1436.

European Examination Report dated Oct. 18, 2002.

Acampora et al., "A New Adaptive MAC Layer Protocol for Wireless ATM Networks in Harsh Fading and Interference Environments", 1997 IEEE, pp. 410–415.

Agee, "Blind Separation and Capture of Communication Signals Using A Multitarget Constant Modulus Beamformer", Oct. 7, 1989 Proc. IEEE Military Communications Conference, vol. 2, pp. 1–12.

Franks, "Synchronization Subsystems: Analysis and Design", 1981, Digital Communications Satellite/Earth Station Engineering, pp. 294–335.

Friedlander, "Direction Finding Using an Interpolated Array", Apr. 3, 1990, International Conference on Acoustics, Speech, and Signal Processing, vol. 5, pp. 2951–2954.

Friedlander et al., "Direction Finding for Wideband Signals Using an Interpolated Array", 1991, IEEE Publication, pp. 583–587.

Krishnamurthy et al., "Polling Based Media Access Protocols For Use With Smart Adaptive Array Antennas", 1998 IEEE, pp. 337–344.

Lee et al., "Decision Directed Carrier Recovery—Chapter 16: Carrier Recovery", 1994 Digital Communications, 2nd Edition, Kluwer Academic Pub., pp. 725–736.

Lee et al., "Decision Directed Carrier Recovery—Chapter 17: Timing Recovery", 1994 Digital Communications, 2nd Edition, Kluwer Academic Pub., pp. 737–764.

Lundell et al., "Applications of the Constant Modulus Adaptive Beamformer to Constant and Non–Constant Modulus Signals", Proceedings, 1998 Asilomar Conference on Signals, Systems, and Computers (ACSSC–1988), pp. 432–436.

Muhamed et al., "Direction of Arrival Estimation Using Antenna Arrays", 1996, The Bradley Dept. of Electrical Enginerring, Mobile and Portable Radio Research Group, Section 3.8, pp. 64–71.

vander Veen et al., "A Constant Modulus Factorization Technique for Smart Antenna Applications in Mobile Communications", SPIE 1994 "Advanced Signal Processing Algorithms, Architectures, and Implementations V", vol. 2296, pp. 230–241.

Talwar et al., "Recursive Algorithms for Estimating Multiple Co–Channel Digital Signals Received at an Antenna Array", Proc. Fifth Annual IEEE Dual Use Technologies and Applications Conference.

Papadias et al., "A Space–Time Constant Modulus Algorithm for SDMA Systems", 1996, Proceedings, IEEE 46th Vehicular Technology Conference, pp. 86–90.

Talwar et al., "Blind Estimation of Multiple Co–Channel Digital Signals Arriving at an Antenna Array", 1993, Proc. 27th Asilomar Conference on Signals, Systems, and Computers, vol. 1, pp. 349–342.

Rashid–Farrokhi et al., "Joint Power Control and Beamforming for Capacity Improvement in Wireless Networks With Antenna Array", 1996 IEEE GLOBECOM 1996, vol. 1, pp. 555–559.

Rashid–Farrokhi et al., "Transmit Beamforming for Cellular Communication Systems", Conference on Information Sciences and Systems, CISS–97; Mar. 1997, 4 pages.

Rashid–Farrokhi et al., "Downlink and Uplink Capacity Enhancement in Power Controlled Cellular Systems", Proceedings, 1997 IEEE 47th Vehicular Technology Conference, vol. 2, 5/97, pp. 647–651.

Rashid–Farrokhi et al., "Downlink Power Control and Base Station Assignment", IEEE Communications Letters, vol. 1, No. 4, 07/97, pp. 102–104.

Rashid–Farrokhi et al., "Transmit Diversity and Equalization for Power Controlled Wireless Networks", Conference Record 31st Asilomar Conference on Signals, Systems, and Computers, vol. 1, 11/97, pp. 620–624.

Xu et al., "Throughput Multiplication of Wireless LANs for Multimedia Services: SDMA protocol Design", 1994, IEEE, pp. 1326–1332.

Swidlehurst et al., "Analysis of a Decision Directed Beamformer", IEEE Transactions on Signal Processing, vol. 43, No. 12, 12/95, pp. 2920–2927.

Zhang et al., "Performance of a Modified Polling Strategy for Broadband Wireless LANs in a Harsh Fading Environment", 1991, GLOBECOM 1991, pp. 1141–1146.

US98/25364, PCT Search Report, May 11, 1999.

METHOD FOR REFERENCE SIGNAL GENERATION IN THE PRESENCE OF FREQUENCY OFFSETS IN A COMMUNICATIONS STATION WITH SPATIAL PROCESSING

RELATIONSHIP TO OTHER PATENTS OR PATENT APPLICATIONS

This application is a continuation of application Ser. No. 09/153,110, filed Sep. 15, 1998 entitled "Method for reference signal generation in the presence of frequency offsets in a communications station with spatial processing", presently pending.

This is a continuation in part to U.S. patent application Ser. No. 08/729,390, filed on Oct. 11, 1996 now U.S. Pat. No. 5,909,470, entitled METHOD AND APPARATUS FOR DECISION DIRECTED DEMODULATION USING ANTENNA ARRAYS AND SPATIAL PROCESSING, Barratt et al., inventors, (called the "Parent Patent" hereinunder). The Parent Patent is incorporated herein by reference in its entirety.

FIELD OF INVENTION

This invention relates to the field of wireless communication, and more specifically, to the generation of a reference signal useful for determining receive weights for spatial processing in the presence of frequency offsets and for demodulating a received signal in the presence of frequency offsets.

BACKGROUND TO THE INVENTION

Cellular wireless communications systems are known, wherein a geographical area is divided into cells, and each cell includes a base station (BS) for communicating with subscriber units (SUs) (also called remote terminals, mobile units, mobile stations, subscriber stations, or remote users) within the cell. We have previously described cellular systems that have BSs that include an array of antenna elements and spatial processing means. When used as receivers, the array of antenna elements introduce multiple versions of each signal, each of these versions comprising the composite of all the co-channel signals together with interference and noise. With multiple antennas, the relationship in both amplitude and phase of a signal of interest from a particular remote user to the interfering co-channel signals (i.e., signals from other remote users) will be different in each of the antenna signals due, for example, to geometric considerations, both because the antennas are separated by some distance, and, in some cases, because the different remote users also are separated. Using such an antenna array, spatial processing by weighting the received signals in amplitude and phase by different weights provides many advantages, including the possibility of spatial division multiple access (SDMA) techniques, in which the same "conventional channel" (i.e., the same frequency channel in a frequency division multiple access (FDMA) system, timeslot in a time division multiple access (TDMA) system, code in a code division multiple access (CDMA) system, or timeslot and frequency in a TDMA/FDMA system) may be assigned to more than one subscriber unit.

Some examples of a cellular system are digital systems which use variants of the Personal Handy Phone System (PHS) protocol defined by the Association of Radio Industries and Businesses (ARIB) Preliminary Standard, RCR STD-28 (Version 2) December 1995, and digital systems that use the Global System for Mobile communications (GSM) protocol, including the original version, 1.8 GHz version called DCS-1800, and the North American 1.9 GHz personal communications system (PCS) version called PCS-1900.

When a signal is sent from a remote unit to a base station (i.e., communication is in the uplink), the base station having a receiving antenna array (usually, and not necessarily the same antenna array as for transmission), the signals received at each element of the receiving array are each weighted, typically after downconversion (i.e., in baseband), in amplitude and phase by a receive weight (also called spatial demultiplexing weight), this processing called spatial demultiplexing, or spatial processing, all the receive weights determining a complex valued receive weight vector which is dependent on the receive spatial signature of the remote user transmitting to the base station. The receive spatial signature characterizes how the base station array receives signals from a particular subscriber unit in the absence of any interference. This invention is described for uplink communications in a cellular system, although the techniques certainly are applicable to the design of any receiver for any digitally modulated signal where it is desired to reduce the effects of frequency offset.

In systems that use antenna arrays, the weighting of the baseband signals either in the uplink from each antenna element in an array of antennas, or in the downlink to each antenna element is called spatial processing herein. Spatial processing is useful even when no more than one subscriber unit is assigned to any conventional channel. Thus, the term SDMA shall be used herein to include both the true spatial multiplexing case of having more than one user per conventional channel, and the use of spatial processing with only one user per conventional channel. The term channel shall refer to a communications link between a base station and a single remote user, so that the term SDMA covers both a single channel per conventional channel, and more than one channel per conventional channel. The multiple channels within a conventional channel are called spatial channels. For a description of SDMA systems that can work with more than one spatial channel per conventional channel, see, for example, co-owned U.S. Pat. No. 5,515,378 (issued May 7, 1996) and U.S. Pat. No. 5,642,353 (issued Jun. 24, 1997) entitled SPATIAL DIVISION MULTIPLE ACCESS WIRELESS COMMUNICATION SYSTEMS, Roy, III, et al., inventors, both incorporated herein by reference; and co-owned U.S. Pat. No. 5,592,490 (issued Jan. 7, 1997) entitled SPECTRALLY EFFICIENT HIGH CAPACITY WIRELESS COMMUNICATION SYSTEMS, Barratt, et al., inventors. The Parent Patent describes demodulation in a SDMA system that has only one spatial channel per conventional channel.

SDMA systems use spatial processing as the backbone to improve system capacity and signal quality. In the Parent patent, we described generating a reference signal from the received antenna signals, and how the reference signal can then be used to determine the spatial demultiplexing weights. In such a system, the performance of the spatial processor depends on many factors, including:

The input signal-to-noise ratio (SNR);

The number of interferers or carrier-to-interference ratio (CIR);

The spatial correlation between the users; and

The quality of the reference signal.

Each of these will now be briefly explained. The input SNR at the antenna elements is determined by the transmitted power of the subscriber unit, the antenna gains, the path losses, and other RF effects.

The input CIR is determined by the transmitted power of the subscriber unit, and the powers of the other users and interferers occupying the same conventional channel (e.g., same frequency band) or emitting energy in that channel.

The reference signal is the replica of the transmitted signal that is generated at the receiver to train the demultiplexing weights for the signals received by the antenna array elements. The quality of the reference signal determines the nulling ability of the array. In the uplink, the improvement in the nulling ability of the array results in an increase in the output SINR. Therefore if the quality of the reference signal is improved, the BER performance in the uplink is improved. Improving the quality of reference signal generation and demodulation is the subject of this invention.

The receive (copy) weights may be determined from samples of the input signal and from the reference signal.

Thus there clearly is a need for improved demodulation and reference signal generation methods and systems for use in communication systems that include an antenna array and spatial processing.

The Parent Patent described the use of a demodulator/reference signal generator that tracked the frequency offset from sample to sample by relaxing the phase expected from the modulation scheme back towards the actual phase of the input signal. The present invention extends these methods.

SUMMARY

An object of the present invention is a reference signal generation method for use in communication systems that include an antenna array and spatial processing.

Another object of the present invention is for a demodulation method for use in communication systems that include an antenna array and spatial processing.

Yet another object of the present invention is for a reference signal generation method for use in an alternating projections method for determining weights for spatial processing in a communications station that includes an array of antennas and means for applying spatial processing.

Briefly, for a signal transmitted to the communications station from a remote station, the method includes weighting the signals received at the antenna elements of the antenna array of the communications station to form a copy signal corresponding to the signal from the particular remote station, the weighting using a spatial weight vector corresponding to the particular remote station, and determining samples of the reference signal by, at each sample point, constructing an ideal signal sample from the copy signal at the same sample point, the ideal signal sample having a phase determined from the copy signal at the sample point, with the phase of the ideal signal sample at an initial symbol point set to be an initial ideal signal phase, and relaxing the phase of the ideal signal sample towards the copy signal sample phase to produce the phase of the reference signal. The spatial weight vector is initially some initial weight vector and is determined from the received antenna signals and from the reference signal. The phase of the ideal is determined from the phase of the reference signal at the previous sample point for which the phase is determined, and from a decision based on the copy signal. In one implementation, the reference signal is determined in the forward time direction, and in another implementation, the reference signal samples are determined in the backwards time direction. In one version, the step of relaxing the phase of the ideal signal sample towards the phase of the copy signal $b_N(n)$ corresponds to adding a filtered version of the difference between the copy signal phase and ideal signal phase. In another version, the step of relaxing the phase of the ideal signal sample towards the phase of the copy signal corresponds to forming the reference signal sample by adding to the ideal signal sample a filtered version of the difference between the copy signal and ideal signal.

In another aspect of the invention, a method for generating a reference signal for a modulated signal transmitted from a remote station to a communications station that includes an array of antenna elements and spatial processing means is disclosed, the method including: separating from the signals received at the antenna elements a copy signal corresponding to the signal transmitted by the particular remote station, the separating using an initial spatial weight vector corresponding to the particular remote station; determining from the terminal copy signal a reference signal having substantially the same frequency offset and time alignment as the received antenna signals; and computing a new spatial weight vector by optimizing a cost function, the cost function using the received antenna signals and the reference signal. For demodulation, the method further includes extracting the symbols of the modulated signal. The separating step and possibly the reference generating step may be repeated at least once, using in the repetition of the separating step the new spatial weight vector previously determined in the new weight computing step instead of the initial spatial weight vector. In one implementation, the reference signal generating further includes estimating a frequency offset and a timing misalignment of the copy signal; and correcting the copy signal for frequency offset and timing misalignment to form a corrected copy signal. In this, the reference signal determining step includes synthesizing a corrected reference signal that has substantially the same frequency offset and timing alignment as the corrected copy signal; and applying frequency offset and time misalignment to the corrected reference signal to form a frequency offset and time misaligned reference signal having the same frequency offset and time misalignment as the received antenna signals.

In one implementation, the step of determining the reference signal includes, for each of a set of sample points, constructing an ideal signal sample from the copy signal at the same sample point, the ideal signal sample having a phase determined from the copy signal at the sample point, with the phase of the ideal signal sample at an initial symbol point set to be an initial ideal signal phase, relaxing the phase of the ideal signal sample towards the copy signal sample phase to produce the phase of the reference signal; and producing the reference signal having the phase of the reference signal determined in the relaxing step.

In another implementation, the corrected reference signal synthesizing step includes coherently demodulating the corrected copy signal to form signal symbols; and re-modulating the signal symbols to form the corrected reference signal having substantially the same timing alignment and frequency offset as the corrected copy signal.

BRIEF DESCRIPTION OF THE DRAWINGS

The present invention will be more fully understood from the detailed preferred embodiments of the invention, which, however, should not be taken to limit the invention to any specific embodiment but are for explanation and better understanding only. The embodiments in turn are explained with the aid of the following figures.

DETAILED DESCRIPTION OF THE PREFERRED EMBODIMENTS

Base Station Architecture

Figure 3:
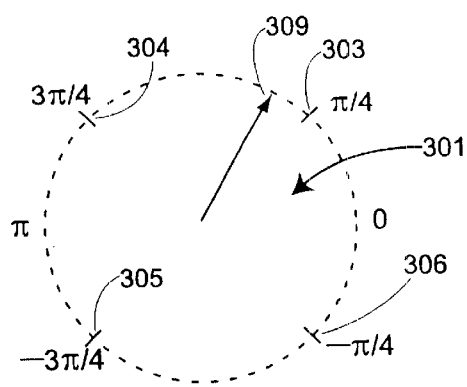
FIG. 3 shows the constellation of a DQPSK signal.

The invention is applicable to any digital radio receiver that suffers from frequency offset effects and that includes spatial processing means. The illustrative embodiments are for use in a radio receiver that uses an array of antenna elements to receive a corresponding set of antenna signals, and spatial processing means for weighting the antenna signals in amplitude and phase. In particular, the illustrative embodiments are for use in a base station of a cellular system that uses the Personal HandyPhone (PHS) air interface standard. The PHS system uses time division multiple access (TDMA) with individual timeslots corresponding to conventional channels. PHS also uses $\pi/4$ differential quaternary phase shift keying $\pi/4$ DQPSK) modulation for the baseband signal. The baud rate is 192 kbaud (a baud is a symbol per second). In PHS as used in the preferred embodiment, a burst is defined as the finite duration RF signal that is transmitted or received over the air during a single timeslot. A group is defined as one set of 4 transmit (TX) and 4 receive (RX) timeslots. A group always begins with the first TX timeslot, and its time duration is 8×0.625=5 msec. In order to support half rate and quarter rate communication, the PHS standard defines a PHS frame as four groups, that is, four complete cycles of the eight timeslots. In the illustrative base station embodiments described herein, only full rate communication is supported, so that in this description, the term frame shall be synonymous with the PHS term group. That is, a frame is 4 TX and 4 RX timeslots and is 5 ms long. For any conventional channel, the bursts are one frame period apart and consist of 120 baud periods, and includes 110 samples of an actual signal and ten more samples to form a 10 baud-period long "guard time" to ensure that there are no collisions of bursts. Note that for other protocols, such as GSM, different guard times may be used. Each symbol in the PHS bursts contains two bits (a dibit) of information. A dibit is mapped onto the phase difference between two successive symbols, not the phase of the symbol itself. FIG. 3 shows the complex differential phase plane 301 together with the complex phase plane representation as a vector of a differential data symbol 309, defined as the complex valued division of two successive symbols. Also shown on phase plane 301 are the four decision points 303, 304, 305, and 306 at (differential) phases $\pi/4$, $3\pi/4$, $5\pi/4$ and $7\pi/4$ (that is, $\pm\pi/4$ and $\pm 3\pi/4$). These make up the constellation of decisions. Any frequency offsets present may be thought of as rotations of the constellation points relative to the received differential signal 309.

The various aspects of the present invention may be implemented on any communications station for receiving a signal from some remote station, not just a base station of a cellular system. The illustrative embodiments are base stations. How to make the modifications necessary to implement the invention on any communications station with spatial processing would be clear to one of ordinary skill in the art from the details provided herein for implementing the invention on the illustrative embodiment base stations. One such illustrative embodiment is for a base station for a low mobility PHS system. Such a base station is described in detail in the Parent Patent, and uses an array of four antenna elements. The second illustrative base station type is for use in a PHS cellular system with subscriber units that are fixed in location. Such systems are known in the art as wireless local loop (WLL) systems because they may be used to replace the final "local" loop in a telephone network. The architecture of the second illustrative type of base station (a WLL base station) for the preferred embodiment is described in detail in co-owned U.S. patent application Ser. No. 09/020,049 (filed Feb. 6, 1998) entitled POWER CONTROL WITH SIGNAL QUALITY ESTIMATION FOR SMART ANTENNA COMMUNICATION SYSTEMS, Yun, Inventor, incorporated-herein-by-reference (hereinafter "Our Power Control Patent"). Such a WLL base station may have any number of antenna elements, and the description herein will assume a 12-antenna array if no other number is explicitly mentioned for the second illustrative type of base station.

Figure 1:
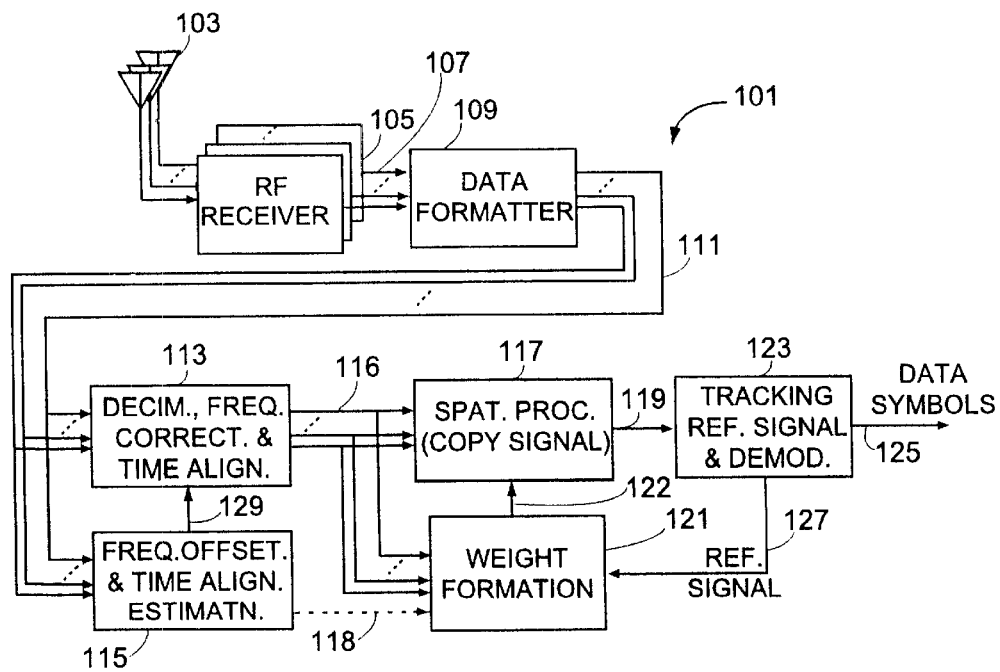
FIG. 1 is a block diagram of the first embodiment of a spatial processing receiver system that includes a reference signal generator and demodulator according to some aspects of the invention.

FIG. 1 summarizes the architecture of the receiving section 101 of a base station similar to the low mobility base station described in the Parent Patent, including demodulation and reference signal generation according to one aspect of the invention. In general, let the number of antenna elements (shown as 103) be denoted by integer m. The base station includes a set of m receivers 105, one per antenna element, that determine an oversampled set 107 of m complex valued baseband received signals. Not shown are such details as the transmit/receive switches (the illustrative base stations use the same antenna elements for reception and transmission), filters, etc. Receivers 105 may be analog with a final analog to digital converter at baseband, or may include one or more stages of digital downconversion. The PHS system uses TDMA with individual timeslots corresponding to conventional channels. The received signals 107 are organized into signals for individual timeslots by a data formatter 109, and each set 111 of received signals for a particular timeslot is used by a frequency offset and timing offset estimator 115 to determine the frequency offset and timing alignment. A decimator, frequency offset estimator/corrector and timing aligner 113 determines the non-oversampled samples of the received signals closest to the baud point from the oversampled sequences. These baud-rate received signals 116 are coupled to a spatial processor 117 for determining a complex valued signal 119 (in phase I and quadrature Q data) for a particular subscriber unit according to a set of receive weights 122 for that remote user. The receive weights 122 are determined by a weight formation processor 121 using the baud rate received signals 116. See below and the Parent Patent for how receive weights are determined. In alternate embodiments that also use TDMA, the spatial processing may be carried out for all timeslots with the same spatial processor, making data formatter 109 unnecessary, while alternate embodiments for systems that do not use TDMA would use a different receive processing architecture. The frequency offset and timing alignment is determined in block 115 in the mobile PHS preferred embodiment base station as described in the Parent Patent and in co-owned U.S. patent application Ser. No. 08/729,386 (filed Oct. 11, 1996) entitled METHOD & APPARATUS FOR ESTIMATING PARAMETERS OF A COMMUNICATION SYSTEM USING ANTENNA ARRAYS & SPATIAL PROCESSING., Parish, et al., inventors (hereinafter "Our Estimation Patent").

The spatial processor 117 produces a baud-rate sequence of complex valued samples 119 of the baseband signal, these samples close to the baud points. These samples are then demodulated by tracking reference signal generator and demodulator 123 to generate the data symbols 125 and a reference signal 127. The reference signal is used by the weight determiner 121 which uses an optimization method to determine the weights 122 (the set forming a weight vector) that generate a copy signal from received signals 116 which in some sense is "closest" to the reference signal 127. To work well, this requires that the received signal 116 and the reference signal be time aligned and have the same frequency offset.

Figure 2:
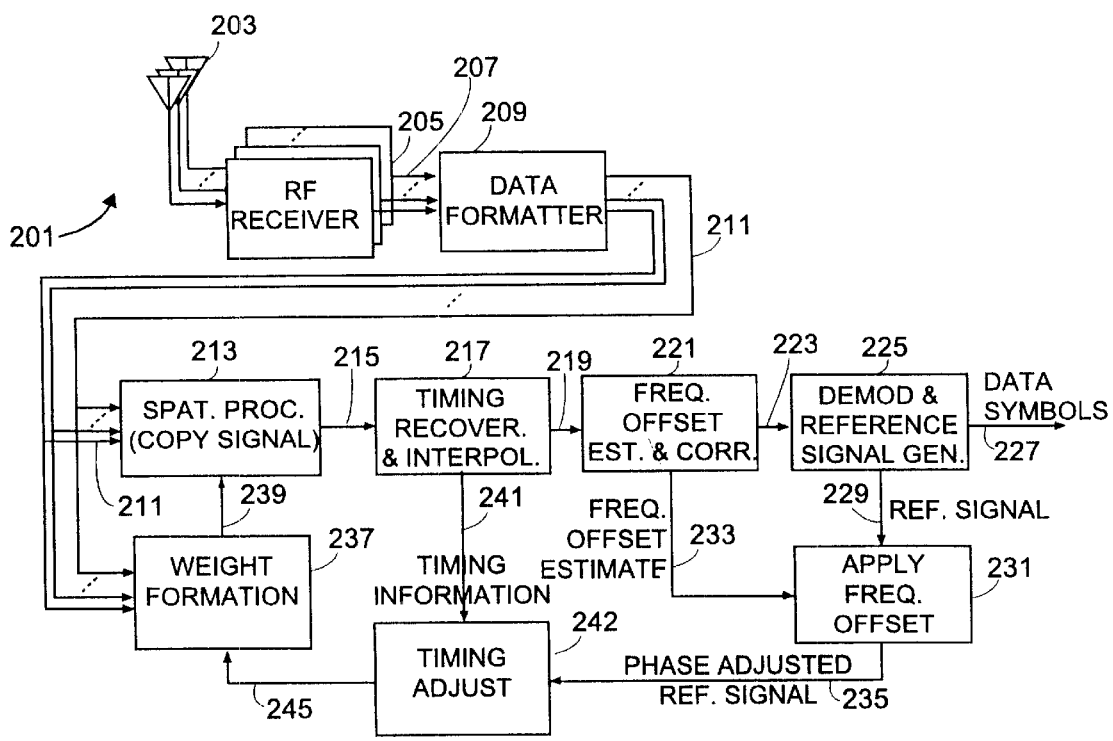
FIG. 2 is a block diagram of the second embodiment of a spatial processing receiver system that includes a reference signal generator and demodulator according to some aspects of the invention.

FIG. 2 is a block diagram showing an architecture for a receiving section 201 of a WLL base station, which includes an alternate embodiment of the demodulation and reference signal generation according to an aspect of the invention. The m antenna elements are shown as 203, and are coupled to a set of m receivers 205, one per antenna element, that determine an oversampled set 207 of m complex valued baseband received signals. Again, the transmit/receive switches, filters, etc. are not shown. The received signals 207 are organized into signals for individual timeslots by a data formatter 209. One difference between this embodiment and the embodiment of FIG. 1 is that a copy signal is obtained here from the oversampled data prior to any frequency offset and time alignment correction, while in FIG. 1, frequency offset and time alignment correction, decimation, and baud-point estimation occurs before the main copy signal operation. Thus, each set 211 of received signals for a particular timeslot is weighted by spatial processor 213 to determine a complex valued signal 215 (in phase I and quadrature Q data) for a particular subscriber unit according to a set of receive weights 239 for that remote user. The receive weights 239 are determined by a weight formation processor 237 using the received signals 211. In the preferred embodiment, to save signal processor device processing cycles, the spatial processing block 213 carries out the weighting operation on input data 211 which has first been decimated by two. That is, not on the three-times over-sampled data 211, but on one and one-half times over-sampled data. The result is then interpolated back to three-times oversampled data 215. Of course other methods may be used. Note also that signal 215 contains frequency offsets and timing misalignment. As in the embodiment of FIG. 1, weight formation processor 237 minimizes a cost function that compares the copy signal to a reference signal. This cost function optimization preferably uses a least squares procedure by comparing the copy signal to a reference signal. However, since the received signal 211 has possibly gross frequency offset and time misalignment, the reference signal used has the appropriate frequency offset and time misalignment included. In the preferred embodiment, the reference signal is baud-rate sampled. Since signals 211 are oversampled, weight formation unit 237 decimates input data burst 211 by the oversampling factor (preferably three). The time misalignment is applied to the phase adjusted reference signal by a timing adjustment filter 242 to produce phase and timing adjusted reference signal 245, the timing adjustment using timing information 241. This timing information is determined in a timing recovery and interpolation unit 217 that also time aligns and interpolates signal 215 to output a baud rate signal 219 which comprises baud-point aligned samples of the received signal. Since this signal 219 still has frequency offset, it is input into a frequency offset estimator and corrector 221. One output is a frequency corrected, baud-point aligned received signal 223. A second output is an estimate 233 of the frequency offset which is used in block 231 to apply frequency offset to a reference signal 229 to produce the phase adjusted reference signal 235 for the timing adjustment filter 242 and ultimately the reference signal 245 for the weight determiner 237. Frequency corrected, baud-point aligned received signal 223 is demodulated by the demodulator and reference signal generator 225 to produce the data symbols 227, and also to produce the reference signal 229. Two versions of the demodulator/reference signal generator 225 are used with this architecture, corresponding to different aspects of the invention, the first version a tracking reference signal generator and demodulator, and the second version a synchronous (coherent) demodulator together with a re-modulator used to form the reference signal 229.

Note that the word demodulation as used herein means either determining the data bits of the message, or determining the symbols only for the purpose of forming a reference signal. Thus demodulation as used herein includes what sometimes is called detection in the art. Note also that when one tracks the phase of a signal, for example by using a tracking reference signal generator or tracking demodulator, the resulting signal may be assumed to have the same frequency offset as the input to the generator or demodulator. Note also that the term timing alignment includes any decimation or time shifting or both to correct for timing misalignment.

Note also that while in the preferred embodiments, weight formation processor 237 uses a least squares cost function that compares the copy signal to a reference signal, weight formation processor 237 may be designed to optimize many different cost functions, and one even can use a different cost function burst to burst. The invention is not limited to optimizing any particular type of cost function nor to having a cost function that remains the same.

In both the illustrative base stations of FIGS. 1 and 2, the spatial processing, frequency offset correction, timing alignment, baud point decimation and the reference signal generation and demodulation are carried out by running a set of programming instructions in a single digital signal processing (DSP) device coupled to a DSP memory. There is one such receive DSP (RX DSP) and one associated receive DSP memory per timeslot. The timeslot RX DSPs are controlled by a general purpose microprocessor (in the illustrative WLL PHS base station) or another DSP (in the illustrative mobile PHS base station).

Figure 5:
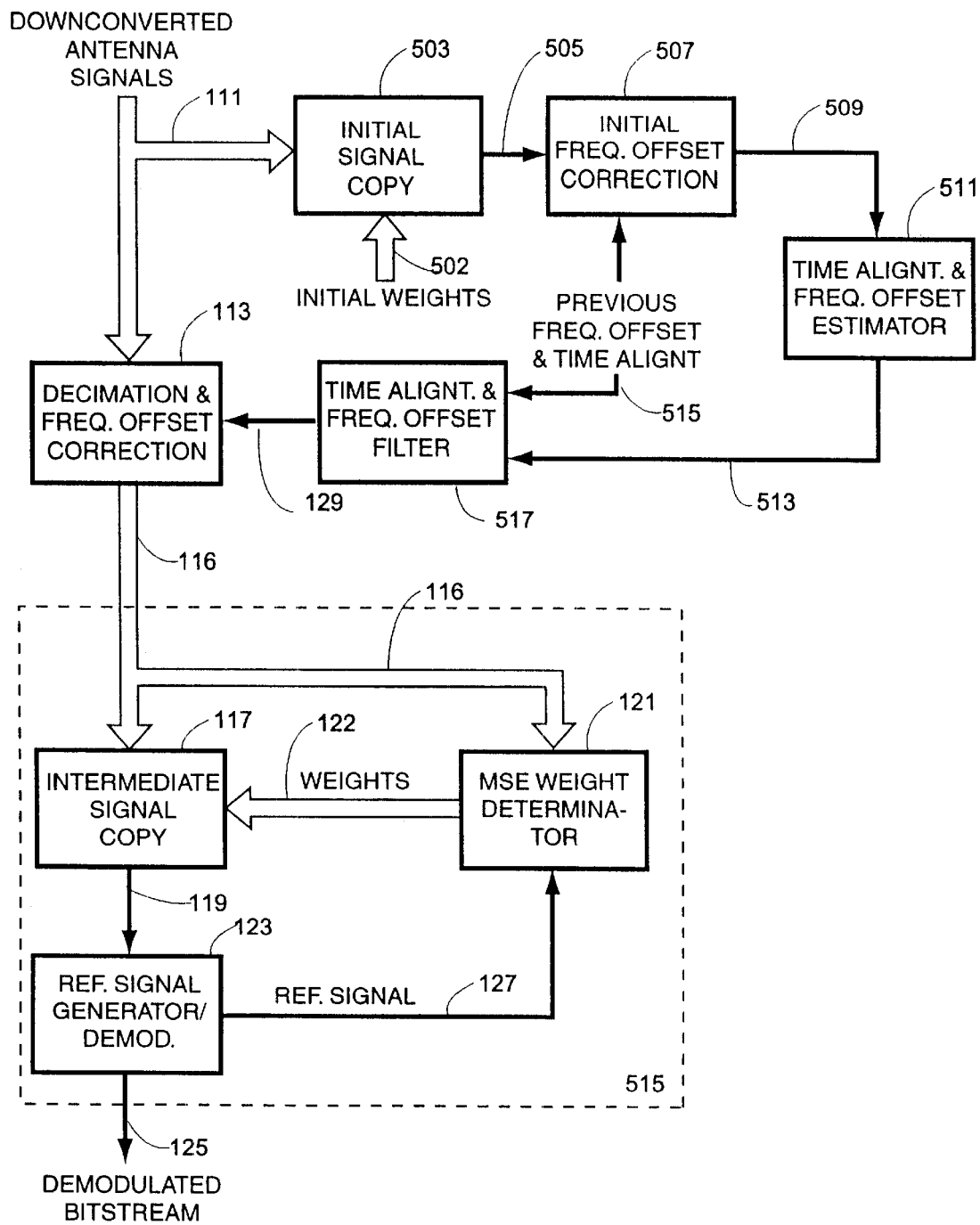
FIG. 5 is a flow chart of the timing alignment estimation method used in the preferred embodiment of the system of FIG. 2.

Spatial Processing and Frequency Offset and Timing Correction: First Embodiment FIG. 5 summarizes the preferred embodiment spatial processing, frequency offset correction, timing alignment, and baud point decimation of blocks 113, 117, and 121, and the reference signal generation/demodulation of block 123 of FIG. 1. The processing for a signal from a particular subscriber unit is described. Two modes of operation during reception are SYNCH mode where an initial estimate of the receive weights, (denoted by the complex valued column vector $w_r$ of the m receive weights) and of the alignment and frequency offset are obtained. Normal mode is the spatial processing and demodulation of bursts of PHS data, for example, traffic channel data. Normal mode processing is carried out burst-by-burst and the first time the loop is entered, it is entered from SYNCH mode with starting estimate of the receive weight vector $w_r$ and of the time alignment and frequency offset. Then on an ongoing basis, the processing starts with estimates of the receive weights, the alignment and the frequency offset obtained from the processing of the same signal on the previous burst for the timeslot. The initial weights (from the last burst or from SYNCH mode) are shown as weight vector 502. The data to be processed consists of the downconverted oversampled baseband signals 111 from receivers 105 and data formatter 109. Using the starting value 502 of the weight vector, an estimate 505 of the signal from the user of interest is produced by an initial signal copy operation 503. Denoting the downconverted received signals 111 by m-vector z(t), and the signal estimate by ŝ(t), the estimate 505 may be expressed as the weighted sum of the m individual received signals in vector notation as $\hat{s}(t)=w_r^H z(t)$, where the superscript H indicates the Hermitian transpose, which is the complex conjugate transpose, and t is the time index of the (oversampled) signal samples. Block 507 corrects initial copy signal 505 for frequency offset using the frequency offset from the last burst, or from the SYNCH mode if this is the first burst. The frequency corrected initial copy signal 509 is now used in block 511 to compute a new frequency offset difference estimate and an alignment estimate. The resulting frequency offset difference and alignment estimates 513 are combined in an estimate filter 517 with estimates 515 from previous frames, or with the SYNCH mode estimate if this is the first frame, to produce the updated frequency offset and alignment estimates 129. The purpose of filter operation 517 is to constrain the change in frequency offset and alignment from frame to frame so that the presence of a strong interfering signal does not upset the estimates of these quantities. Block 113 uses the frequency offset and alignment estimates to correct the input signal data z(t) to produce a corrected and decimated version of z(t), denoted as $Z_N(t)$, and labeled 116 on FIG. 1 and the flowchart of FIG. 5 for the illustrative mobile PHS base station embodiment. Since the signal for the mobile PHS embodiment is eight times oversampled, the decimation is by a factor of eight to give one $Z_N(t)$ sample per symbol, which is 120 samples per burst. Note that incrementing index t moves one sample period in signal 116 and ⅛ of a sample period for signals 111, 505, and 509.

Ad The decimation part of the decimation and frequency correction unit 113 consists of preserving only those points that are closest in alignment to the exact symbol times. The frequency correction consists of multiplying in time with the appropriate phase to adjust the residual frequency within the accuracy of the estimate.

These $Z_N(t)$ samples are now used in a recursive loop 515 to demodulate the signal and to estimate the weight vector to use for the other bursts or as $w_{r0}$ for the next frame.

In block 117, an intermediate copy signal 119 is produced from $Z_N(t)$ with the best estimate 122 of $w_r$ which initially is the value 502 used in the initial copy operation 503. As updates 122 are obtained to $w_r$, such updates, denoted by $w_{rN}$, are used in block 117 to produce the decimated and corrected copy signal 119, denoted by $\hat{s}_N(t)$. Note that the real (i.e., I-data) and imaginary (i.e., Q-data) parts of signal 119 are the outputs 119 of spatial processor 117 of FIG. 1. Thus block 117's operation is $$\hat{s}_N(t) = w_{r_N}^H z_N(t),$$

with initially $W_{rN}=w_r$. This signal copy operation 117 can be carried out more efficiently than the initial copy operation 503 because now, after decimation, only an eighth of the original 960 signal samples are involved for each burst.

The corrected copy signal 119 is demodulated in block 123 to produce the demodulated bitstream 125 and a reference signal 127 denoted as $s_R(t)$. Block 123 uses the finite alphabet properties of the corrected copy signal and of the known modulation format to produce the reference signal $s_R(t)$ which is frequency matched to $Z_N(t)$. By definition, $S_R(t)$, the reference signal 127, has the required finite alphabet property. Because reference signal 127 does not suffer from such problems as uncertain residual frequency offset and uncertain alignment, it can now be used together with $Z_N(t)$ to determine $w_{rN}$, a better estimate of $w_r$. This is carried out in block 121. Many methods are well known in the prior art for thus projecting onto the $w_r$ plane. The goal is to solve for $W_{rN}$ such that $w_{r_N}^H z_N(t)$ is as close as possible to reference signal $s_R(t)$. The preferred embodiment uses a least squares optimization method, and a constraint on the norm of $w_r$ is added.

The loop may now be repeated, this repeating leading to a new value 122 of $W_{rN}$ which is used for block 117 to determine a new copy signal for then determining a new reference signal. In general, this loop is repeated Num times, and in the preferred embodiment, Num=2. After Num iterations, the demodulated signal 125 is used as the received symbol stream for the particular signal of interest for that burst, and $W_{rN}$, the weight vector 122 is used for the next frame's initial value 502 and the time and frequency offsets are filtered with the previous estimates and supplied to blocks 507 and the filter 517 for the next frame.

The weight estimate 122 produced from the received bursts can be used also for determining the transmit weights to use for transmitting to the same subscriber unit with the array of antennas.

Note that while in this embodiment (and those described below), the loop is repeated a number of times for a single burst, other embodiments are possible within the scope of the invention. For example, the demodulation may not be repeated but determined from the copy signal using the initial weights. Also, the reference signal generated initially from the copy signal using the initial weights may be used to determine the weight only for some future burst, say the next burst. That is, no repetition is used. Other combinations also are possible within the scope.

Demodulation Step: First Version

The Demodulation step 123 in FIG. 1 is now described. This also is used in one version of the system shown in FIG. 2. In one aspect of the invention, the particular method used is that of a tracking demodulator which tracks the phase from symbol to symbol. While the discussion here will use π/4 DQPSK modulation, the invention is applicable to any modulation technique involving phase modulation. For the example, for non-differential phase modulation techniques, the part of the invention that determines differential phase is not used. Rather, the actual phase is used.

One prior-art technique for DQPSK demodulation is to produce the differential phase signal or the ratio signal between subsequent samples, and to identify the quadrant of the phase difference between subsequent symbols. The quadrant of these phase differences determines the transmitted symbol. Such a prior-art technique has two main deficiencies. The first is that the forming the differential signals by taking ratios between subsequent symbols or by some other way is carried out in reality for signals that have noise and distortion, and the ratios thus have more distortion and noise than the original signal. The second deficiency is the making of a "hard" (i.e., irrevocable) decision about the symbol transmitted. Producing a $\pi/4$ DQPSK reference signal based on that hard decision leads to a reference signal that does not include residual frequency offset, which can be visualized as a (typically slow) rotation of the signal constellation, and such a reference signal may not be useable for many purposes, including, for example, re-projection into weight vector space in alternating projection weight vector determinations, such as the step of block 121 or 237.

One aspect of the present invention is a method that solves these two problems simultaneously. The method generates a reference signal (such as signal 127 or 229) that both has the required known modulation (finite alphabet) properties, and that tracks the (typically slow) rotation of the constellation due to residual frequency offset. Demodulation decisions are then made by examining the phase difference between subsequent samples of the actual signal and the reference signal which reduces the noise amplification which occurs with prior art techniques. The method can be conceptualized as generating a reference signal that is advanced first by the ideal phase shift of the decided upon $\pi/4$ DQPSK signal. Then this ideal signal, that has been advanced ideally, is filtered towards the actual signal, so as to keep it from accumulating significant phase (ire., frequency) offsets.

Consider a complex valued signal train (e.g., signal 119 or 223) denoted as $\hat{s}_N(t)$, and let complex valued sequence { $b_N(n)$ } be the complex values of $\hat{s}_N(t)$ at or close to the equally spaced symbol points. Define the differential stream, {$d(n)$} as the sequence formed by dividing $b_N(n)$ by previous sample $b_N(n-1)$, or multiplying $b_N(n)$ by the complex conjugate $b_N^*(n-1)$ of the previous sample. This produces a signal sequence whose phase is the phase shift from one signal sample to the next. That is, $$\angle d(n)=\angle b_N(n)-\angle b_N(n-1),$$

where $\angle$ is the phase. Note that since only the phase is important, an expression of the phase is determined rather than the actual differential sequence { $d(n)$ }. In prior art $\pi/4$ DQPSK demodulation, the quadrant of complex valued $d(n)$ at the ideal differential constellation points is the demodulation decision. Denoting the four quadrants of the complex plane as $\Phi_1$, $\Phi_2$, $\Phi_3$, and $\Phi_4$ for the first, second, third, and fourth quadrants, respectively, prior-art hard decision demodulation can be characterized by statement that $$d(n)\epsilon\Phi_i \rightarrow \angle d(n)=(2i-1)\pi/4, i=1, 2, 3, \text{ or } 4.$$

That the quadrant is sufficient for demodulation is the main consequence of the finite alphabet property of the $\pi/4$ DQPSK signals, and in the ideal case of no residual frequency offset, at an ideal differential constellation point, $\angle d(n)$ would indeed be equal to $\pm\pi/4$ or $\pm\pi/4$ as obtained by simple prior art techniques.

The main goal of step 123 or 225 is to produce a reference signal. A secondary goal is producing the data bits. Let the reference signal have symbols denoted by $b_R(n)$ at the baud (symbol) points t=nT, where T is the baud period ($\frac{1}{192}$ ms for the illustrative PHS embodiments). To produce such a reference signal one starts with a reference signal whose phase at the starting point is some initial phase. A convenient choice is choosing the initial phase to be the same as the phase of $b_N(n)$, the symbols of signal 119 at the starting point. The starting time index t is set to zero for convenience. That is, $$\angle b_R(0)=\angle b_N(0).$$

Note that in the preferred embodiment of the present invention, all of the burst data is available for the processor (the DSP device), and the demodulation and reference signal generation is carried out backwards starting from the last sample in the sequence, so that the phase of the last symbol is determined as a starting point. This is not a restriction, and the invention may also be applied sample by sample when the whole burst is not available. The method, however, is best understood when described using forward determination, so forward determination is assumed below unless otherwise stated explicitly. It would be straightforward for one of ordinary skill in the art to modify this description for running backwards, and to having, and to not having the whole burst available.

For each subsequent decision, an idealized reference signal is defined. In such a idealized signal, the phase is advanced by exactly $\pm/4$ or $\pm 3\pi/4$ from the phase of the previous reference signal, $\angle b_R(n)$, as required by the $\pi/4$ DQPSK scheme. Conventional schemes use this idealized reference signal as the reference signal $s_R(t)$. The problem with this is that the $d(n)$ are relatively insensitive to the slow phase rotation caused by any small frequency offsets in $\hat{s}_N(t)$. Constructing $b_R(n)$ (and hence $s_R(t)$, the reference signal 127 or 229) in this simple manner would cause the phase of $s_R(t)$ to rotate slowly compared to the phase of $\hat{s}_N(t)$, and after some number of symbols, $s_R(t)$ and $\hat{s}_N(t)$ will be completely out of phase. Thus, one might have a cumulative error problem known as phase windup. A reference signal which suffers from phase windup in general is not desirable and certainly not suitable for estimating the weight vector in an alternating projection loop.

The method and apparatus of this invention avoids the phase windup problem by modifying the above "conventional" demodulation method. The phase windup is slow, and hence, assuming the system has done a good job demodulating so far, the phase difference between $b_R(n)$ and $b_N(n)$ is small at any particular point in time (i.e., at a particular value of n). One inventive aspect is that at any point in time, a filter is applied to move the phase of the idealized reference signal a little towards the phase of $b_N(n)$ to form the phase of the required reference signal symbol $\angle b_R(n)$. Let $$b_{ideal}(0)=b_R(0)=b_N(0),$$

and define $\angle d_{ideal}(n)$ as $$\angle d_{ideal}(n)=\angle b_N(n)-\angle b_R(n-1)=\angle b_N(n)b_R^*(n-1).$$

A conventional demodulation decision based on $d_{ideal}(n)$ is made and this decision is then used to the phase of $\angle b_{ideal}(n)$ as follows: if $\angle d_{ideal}(n)\epsilon\Phi_i$, one sets $$\angle b_{ideal}(n)=\angle b_R(n-1)+(2i-1)\pi/4.$$

The phase of $b_{ideal}(n)$ is now relaxed towards the phase of $b_N(n)$ by filtering the quantity $(\angle b_N(n)-\angle b_{ideal}(n))$, the phase error between $b_N(n)$ and $b_{ideal}(n)$, and adding the filtered quantity to the phase of $b_{ideal}(n)$. An alternate embodiment filters the quantity $(b_N(n)-b_{ideal}(n))$ rather than the phase error. In the Parent Patent, the filter is a constant of proportionality. That is, in one embodiment, $$\angle b_R(n) = \angle b_{ideal}(n) + \text{filter}\{\angle b_N(n) - \angle b_{ideal}(n)\}.$$

Note that the quantity $\angle d_{ideal}(n)$ should be in the range $-\pi$ to $+\pi$ and the phase error $\angle b_N(n) - \angle b_{ideal}(n)$ should also be in the range $-\pi$ to $+\pi$ or unwrapped to ensure no sudden jumps of $2\pi$. In an improved embodiment, to ensure no such jumps, the phase error is either unwrapped, or confined to be in the correct range.

When the filter consists of multiplication by $\gamma$, it can be written as $$\angle b_R(n) = \angle b_{ideal}(n) + \gamma(\angle b_N(n) - \angle b_{ideal}(n)),$$

with $\gamma$ a parameter. In an improvement, the phase error is again either confined to be in the range $-\pi$ to $+\pi$, or else unwrapped.

In an alternate embodiment, $$b_R(n) = b_{ideal}(n) + \text{filter}\{b_N(n) - b_{ideal}(n)\},$$

which, when the filter is multiplication by a constant, can be rewritten as $$b_R(n) = b_{ideal}(n) + \gamma(b_N(n) - b_{ideal}(n)),$$

where $\gamma$ is a parameter. With some manipulation, this can be written as $$b_R(n) = \alpha b_{ideal}(n) + (1-\alpha)b_N(n),$$

where $\alpha = 1 - \gamma$ is a parameter which typically is close to 1. In the first preferred embodiment, the mobile PHS system, $\alpha = 0.8$, while for the WLL system, the preferred value for $\alpha$ is 0.5.

In another aspect of this invention, other more complex filters are used. The difference in phase between the real signal and the ideal signal is corrupted by zero mean noise, and the part due to frequency offset represents a DC offset to this noisy difference signal, and is the desired difference signal. The general principal in implementing the invention is to lowpass filter this difference signal to generate the DC offset.

Figure 4:
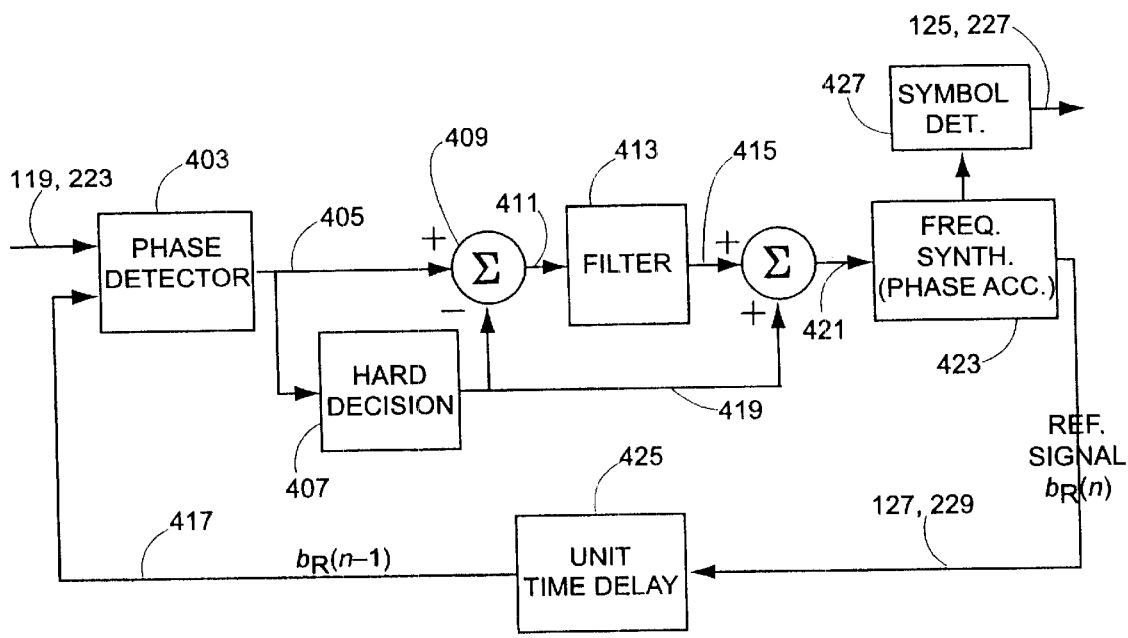
FIG. 4 shows a block diagram for the tracking reference signal generator and demodulator according to some aspects of the invention.

FIG. 4 describes one architecture for the tracking demodulator and reference signal generator in one aspect of the invention. Phase detector Unit 403 detects the phase difference 405 between signal 119 (or 223) and the previous reference signal 417. The phase difference signal 405 is fed to a slicer 407 to generate the decision phase difference 419. The correct phase difference for $\pi/4$ DQPSK is $(2i-1)\pi/4$, $i=1, 2, 3,$ or 4, and is the phase difference between the previous reference signal sample and the ideal signal. This is subtracted in block 409 from the actual phase difference 405 to generate error signal 411. This error signal is filtered in filter 413 to generate filtered error signal 415. It is this filtered error signal that is used to adjust the phase difference 419 closer to the actual phase difference 405. The corrected phase difference 421 is then used in a frequency synthesizer/phase accumulator 423 to generate the reference signal 127 (or 229). It is the previous sample value 417 of the reference signal 127 (or 229) that is used by phase detector 403, so a unit time delay 425 is shown between these signals. The symbols 125 (or 227) are determined by block 427.

Mathematically, the input to phase accumulator 423, $\angle b_R(n) - \angle b_R(n-1)$, is $$\text{filter}\{\angle d_{ideal}(n) - \text{decide}\{\angle d_{ideal}(n)\}\} + \text{decide}\{\angle d_{ideal}(n)\},$$

where decide$\{\angle d_{ideal}(n)\}$ is the output of slicer 407 and equals $(2i-1)\pi/4$, $i=1, 2, 3$ or 4 for $\pi/4$ DQPSK.

The phase detector 403 uses the fact that $\angle d(n) = \angle[b_N(n) b_N^*(n-1)]$. Let $x_{Re}(n) = \text{Real}[b_N(n)b_R^*(n-1)]$ and $x_{Im}(n) = \text{Imag}[b_N(n)b_R^*(n-1)]$ for $n>0$. Then signal $|x_{Re}(n)|+j|x_{Im}(n)| \in \Phi_1$, the first quadrant, in which case, $d_{N_{ideal}}(n)$, when normalized, would be $1/\sqrt{2}+j\, 1/\sqrt{2}$.

The architecture of FIG. 4 may be modified slightly to use $b_R(n) = b_{ideal}(n) + \text{filter}\{b_N(n) - b_{ideal}(n)\}$. In the preferred embodiment, such a tracking reference signal generator is implemented as a set of instructions for a signal processor device. Note again that $\angle d_{ideal}(n) = \angle[b_N(n)b_R^*(n-1)]$. Normalize so that $b_R(0) = b_N(0)/|b_N(0)|$ and let $x_{Re}(n) = \text{Real}[b_N(n)b_R^*(n-1)]$ and $x_{Im}(n) = \text{Imag}[b_N(n)b_R^*(n-1)]$ for $n>0$. The implementation for generating the reference signal for the method described in the Parent Patent can be summarized by the following program (for $\alpha = 0.8$):

```
for (n > 0) {
    x_Re(n) = REAL [b_N(n)b_R*(n − 1)];
    x_Im(n) = IMAG[b_N(n)b_R*(n − 1)];
    K = 2(x_Im(n) < 0) + (x_Re(n) < 0);
    b_R(n) = b_R(n − 1)expj{(2K′ − 1)π/4};
    if (|b_N(n)| > 0)b_R(n) = 0.8b_R(n) + 0.2b_N(n)/|b_N(n)|;
    b_R(n) = b_R(n)/|b_R(n)|;
}
```

In the above, K' is the phase corresponding to the bits K. The data stream (demodulation) can be extracted from $x_{Re}(n)$ and $x_{Im}(n)$ as calculated above.

In the above code, the complex exponential term is implemented using a look-up table. In an alternate implementation, the complex exponential function implementing the frequency synthesizer is implemented using a low order Taylor series expansion. Also, the "$b_N(n)/|b_N(n)|$" term requires a square root operation which in the preferred embodiments is implemented using a Newton Raphson method for the mobile PHS implementation, and a lookup table with 9 bit accuracy for the WLL implementation.

The simplest filter is a multiplicative filter $\gamma$. That is, a filter with a zero order transfer function $$H(z) = \gamma$$

A demodulator with such a zero order filter is called a first order tracking demodulator herein. Better performance is expected by using higher order filters. When a nth order filter is used, the demodulator is called a $(n+1)^{th}$ order tracking demodulator. The phase difference between the input and the previous reference signal (for example 405 in FIG. 4) is theoretically expected to vary within $-\pi$ and $+\pi$ so that the error signal varies between $-\pi/4$ and $+\pi/4$. When a first-order demodulator is implemented, its distribution over this interval is theoretically close to uniform. Implementing the frequency synthesizer which uses the accumulated phase to build a signal is computationally intensive because a sin/cosine (complex exponential) needs to be calculated. For computational simplicity, a low order Taylor series expansion preferably is used. With a first order tracking demodulator, such a Taylor series expansion may become inaccurate for phase error values with magnitude between π/4 and 0.5. Symbol errors also may cause the phase difference between the input and the previous reference signal (for example 405 in FIG. 4) to be out of the −π to +π range because of the resulting phase skips. For this reason, in an alternate implementation, two improvements are added:

In one improvement, a higher order filter is used. In one implementation, this is a first order filter defined in the Z-domain by the transfer function $$H(z) = \frac{\gamma + \beta z^{-1}}{1 - \delta z^{-1}},$$

where γ, β, and δ are parameters. Note that when β, and δ are zero, this reduces to the zero order filter. Parameters used in simulations were γ=0.25, β=0.125, and δ=0.125.

Note that a tracking reference signal demodulator with higher order terms can be constructed in architectures other than that of FIG. 4. Two examples are described. First, consider as a starting point the architecture of FIG. 4. For example, in FIG. 4, the reference signal $$\angle b_R(n) = \angle b_R(n-1) + \text{decide}\{\angle d_{ideal}(n)\} + \text{filter}\{\angle d_{ideal}(n) - \text{decide}\{\angle d_{ideal}(n)\}\} = \angle b_{ideal}(n) + \text{filter}\{\angle d_{ideal}(n) - \text{decide}\{\angle d_{ideal}(n)\}\}.$$

The first term is the ideal signal $b_{ideal}(n)$ and the second the phase correction to relax $\angle b_R(n)$ towards $\angle b_N(n)$. Suppose that the filter is the zero order filter consisting of multiplication by γ. A higher order system can be constructed by adding a second correction term which is a function of the difference between the previous input and the previous reference signal. That is, $$\angle b_R(n) = \angle b_{ideal}(n) + \gamma\{\angle d_{ideal}(n) - \text{decide}\{\angle d_{ideal}(n)\}\} + \gamma\{\angle b_N(n-1) - \angle b_R(n-1)\}.$$

Even higher order terms can be similarly added.

The second example has already been mentioned. Rather than the phase difference between two signals being filtered, the difference between the complex valued signals is filtered. That is, for example, $$b_R(n) = b_{ideal}(n) + \text{filter}\{b_N(n) - b_{ideal}(n)\}.$$

In another improvement, the phase difference 405 is continually checked to maintain it in the range −π to +π, and if a wind-up is found (by the phase error jumping out of the expected range), the phase detector output 405 is changed accordingly by a multiple of 2π.

It often is the case that the beginning of a burst has distortion due, for example, to hardware settling effects. This could lead to a large sequence or errors at the beginning of the burst. As second problem is to select the correct framing information—that is, the actual data symbols from all the symbols in the burst. For example, in the preferred embodiment the PHS protocol is used where the acquired signal which includes each burst is larger than the burst. In particular, the acquired signal has 120 samples (at baud-rate) per burst, of which the burst itself consists of 110 symbols (i.e., 110 baud-rate samples). Many methods are known in the art for determining the beginning of a burst, including, for example, using a known bit sequence. It was observed that in actual data, the amplitude shape of actual bursts seem to show an asymmetry. The burst begins with a ramp up, and ends in a sharp manner with no discernible ramp down. In PHS (an also in GSM and other standards) there may be some power ramp (applied by some power control mechanism) at the beginning of bursts. However, in PHS, there always is some valid data at the end of a burst—the CRC data. It was observed that the end of a PHS burst has an abrupt drop of amplitudes with no power ramp down. Thus, we concluded that the end of the burst is better defined than the beginning of the burst.

Another aspect of the invention solves the framing problem (of choosing the actual data in the burst) and the problems due to the beginning of the burst having high distortion by running the demodulation/reference signal generator (for example, that of FIG. 4) backwards. The last symbol is detected using an adaptive threshold method. The thresholding method proceeds as follows. A rough burst energy estimate is made by selecting a contiguous number of samples from the center of a burst. In the preferred embodiment, 64 samples are taken. The average amplitude of these is obtained. The threshold is set to a fraction, preferably 50% of the average magnitude. In implementation, the sum of 64 samples is obtained, and this is divided by 128 to obtain the threshold value. One scans the burst from the end towards the beginning and selects as the last sample in the burst the first sample encountered (going backwards) that is above the threshold value.

The (absolute) phase of that last sample is determined, and this forms the reference phase for demodulating and generating the reference sequence for the burst. The absolute phase may be determined either from knowing the frequency offset from the previous burst, from estimating, say with a fourth order power estimator, or, in the case of the system of FIG. 2, from frequency offset estimate 233. Note that when going backwards, a positive frequency offset looks like a negative offset.

Note that since the processing occurs in the reverse, the demodulation should take this into account when determining the correct symbols. That is, the constellation points do not have the same meaning. The backwards −π/4 point acts the same as the forward +π/4 point, etc. For example, if the normal differential constellation point are that +π/4 represents dibit 00, +3π/4 represents 01, −3π/4 represents 11, and −π/4 represents 10, then in the backwards running case, one flips the plane around the I axis so that +π/4 represents dibit 10, +3π/4 represents 11, −3π/4 represents 01, and −π/4 represents 00.

Timing and Frequency Offset Estimation

Any reasonable timing and frequency offset estimation methods may be used in the embodiment of FIG. 2 as would be clear to one of ordinary skill in the art. As seen in FIG. 2, the reference signal obtained from the demodulator/reference signal generator 225 is given a frequency offset in block 231 equal to the one estimated in block 221 after the alignment in block 217. The frequency shifted reference signal 235 is then time-aligned with signal 211 in the weight calculation unit 237.

Improved Version of the Second Embodiment

An improved version of using the architecture of FIG. 2 improves the weight calculation by improving the quality of the reference signal. Any improvement in the weight calculation improves the system performance, because it has a better ability to null undesired users. This version replaces the tracking demodulator/reference signal generator with a coherent demodulator to determine the data symbols and a re-modulator to determine the reference signal. Thus, the block diagram of FIG. 2 is modified and shown in FIG. 8. To implement the coherent demodulator 824, the frequency offset in the input to demodulator 824 should be pretty much removed and the initial phase pretty much correctly estimated, otherwise coherent demodulator 824 will have a poor performance. The tracking demodulator/reference signal generator by its nature is tolerant of some frequency offset. Therefore, a good frequency offset estimation method is needed for this improved version using coherent demodulation. Such a frequency offset estimation and correction unit is shown as 821 in FIG. 8. The coherent demodulator 824 provides the data bits 827 which are then re-modulated in re-modulator 826 to obtain the reference signal 835. The reference signal 835 is applied a frequency offset 833 equal to the one estimated after the alignment. Then the frequency shifted reference signal 835 is time-adjusted using timing information 841 in timing adjustment filter 842 to produce a reference signal 845 that has timing that correspond to the misalignment in the received signal 211. The timing adjusted reference signal 845 is then used in weight determining block 237 which carries out the weight calculation as in the first version of the second embodiment.

Timing Estimation

Figure 6:
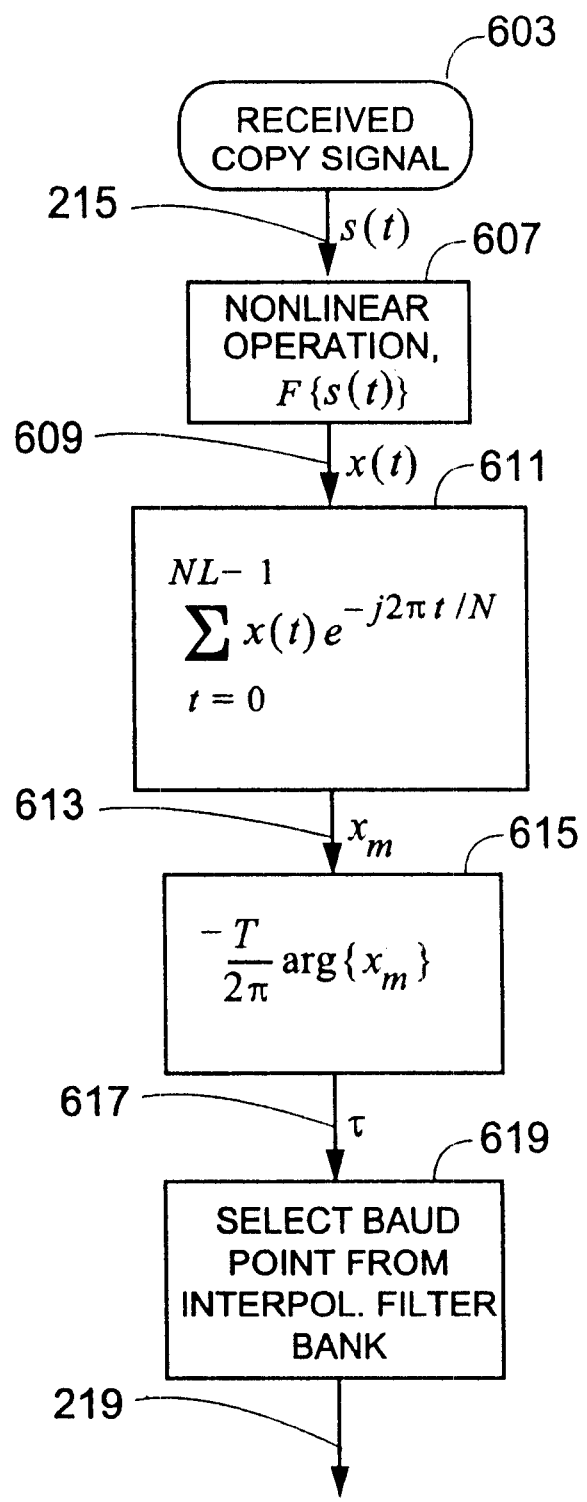
FIG. 6 is a flow chart of the frequency offset estimation method used in the preferred embodiment of the first version of the system of FIG. 2.
Figure 8:
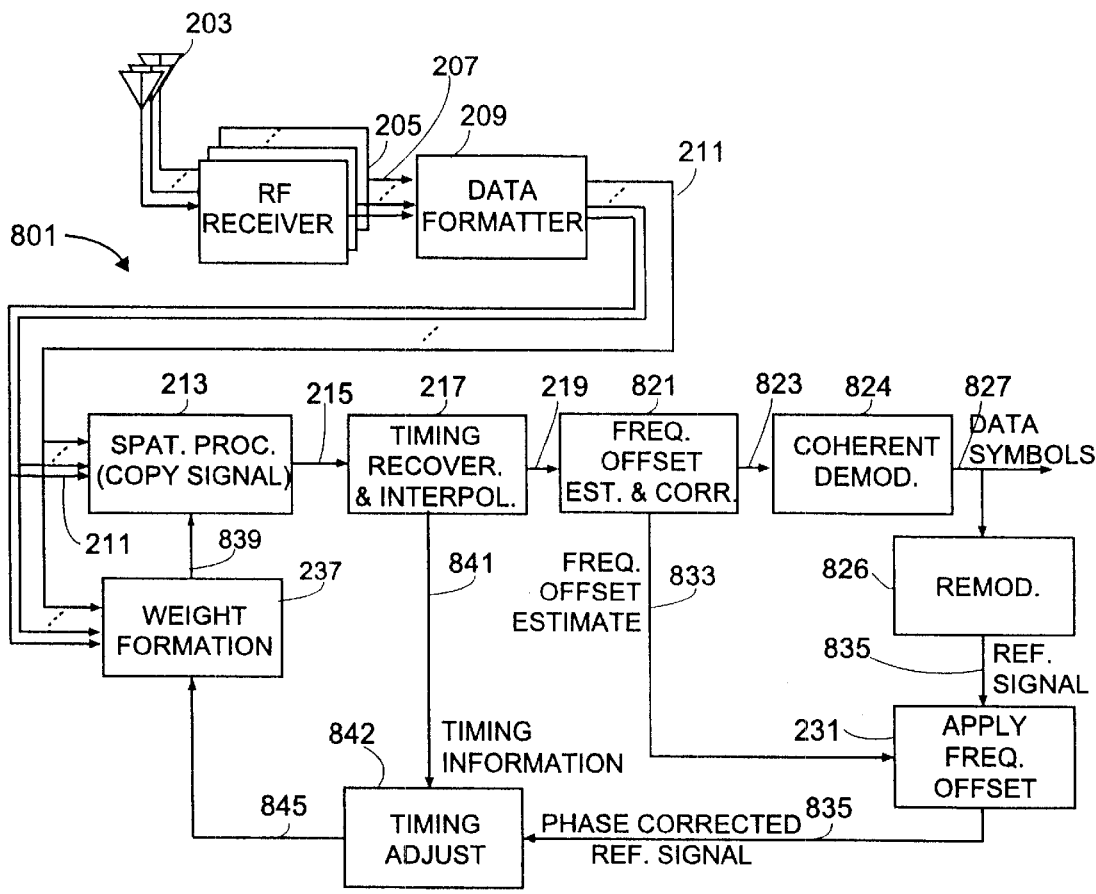
FIG. 8 is a block diagram of the second version of the system of FIG. 2 with a coherent signal demodulator based reference signal generator.

A block-based non-decision aided timing estimator preferably is used in the preferred implementation of the embodiment of FIGS. 2 and 8. The data 215 is three-times oversampled in the preferred embodiment. Many methods would work here. For one method, see for example D'Andrea, Morelli and Mengali, "Feedforward ML-based timing estimation with PSK signals," *IEEE Communications Letters*, Vol. 1, No. 1, pp. 80–82, May 1997. See also Order and Meyr, "Digital filter and square timing recovery," *IEEE Trans. on Communications*, Vol. 36, No. 5, pp. 605–612, May 1988. In the preferred embodiments, the time alignment estimation is done in two steps. In the first step, the samples closest to the baud points are selected. The next step is fine timing alignment. The preferred fine timing estimation method is based on the classical clock recovery technique using a nonlinear operation on the input signal. The flow of operations involved in the estimation of timing is illustrated in FIG. 6. The oversampled copy signal 215, denoted s(t), is passed through a non-linear operation F{ } in step 607, and the first coefficient of a baud-rate DFT is taken in step 611 to form output 613 denoted $x_m$. This is equivalent to passing signal x(t) through a narrow band filter to extract a complex baud-rate sinusoid. After correlation with a sinusoid, the angle of the correlation 613 gives the timing offset, this corresponding to step 615.

A common form for nonlinearity F{ } which can be used is a power law, described as $$F\{s(t)\}=|s(t)|^m,$$

where m=1 (absolute value), 2 (square-law) or 4 (fourth-law). For our system, the square law nonlinearity is preferred. While it performs slightly worse than the absolute nonlinearity, it produces significant savings in computation.

The timing estimate, τ, is obtained as follows $$\tau = -\frac{T}{2\pi}\arg\left(\sum_{k=0}^{NL-1} F\left\{x\left(\frac{kT}{N}\right)\right\}e^{-j2\pi k/N}\right)$$

where F{ } is the non-linear operation, x(t), t=0, 1, . . . , NL−1 is the input signal at time t, arg( ) is the argument function, T is the symbol duration, L is the number of samples per baud, and N is the number of symbols used in the estimation process.

The interpolation part is determining the baud point sample from the oversampled copy signal using τ. Any interpolation method would work here. In the preferred embodiment, a bank of eight finite impulse response (FIR) digital interpolation filters are used with the input being the three-times oversampled data. This provides a time shift in units of ¼₂₄ of a baud (the number of filters times the oversampling factor). The value of τ expressed as a fraction of the baud period determines which filter output to use for the time aligned signal 219. Other implementations are clearly possible.

Frequency Offset Compensation Method

While any accurate offset estimation method may be used, including decision-directed methods and non-decision directed methods, the preferred frequency estimation method is a non-decision directed method that is based on using a power law nonlinearity. The phase of the signal is for an M-PSK signal (including differential M-PSK signal) is passed through an M-power law, and the amplitude through a general (say mth) power law. Thus, if the signal is of the form $s(n)=\rho(n)e^{j\Phi(n)}$ at any discrete time instant n, the nonlinear transformation is of the form $$\gamma(n)=F(\rho(n))e^{jM\Phi(n)},$$

where M is the number of possible symbols per baud and F( ) is of the form $F(\rho(n))=|\rho(n)|^m$. By thus multiplying the phase by M, the phase of γ(n) is reduced to the interval −π to +π. To avoid sign errors, in the preferred embodiment using a π/4-DQPSK modulated signal, the π/4 phase shift in every other symbol is first removed (for example by a rotation achieved by multiplying by 1+j) and then the nonlinear operation is applied on the resulting signal. Denoting any frequency offset present by $f_o$, the time aligned signal 219 may be modeled as $$s(n)=\tau(n)e^{j\Phi(n)}e^{j2\pi n f_0/f_s},$$

where $f_s$ is the sampling frequency. After the nonlinear operation, $$\gamma(n)=|\rho(n)|^m e^{jM2\pi n f_0/f_s}.$$

Figure 9:
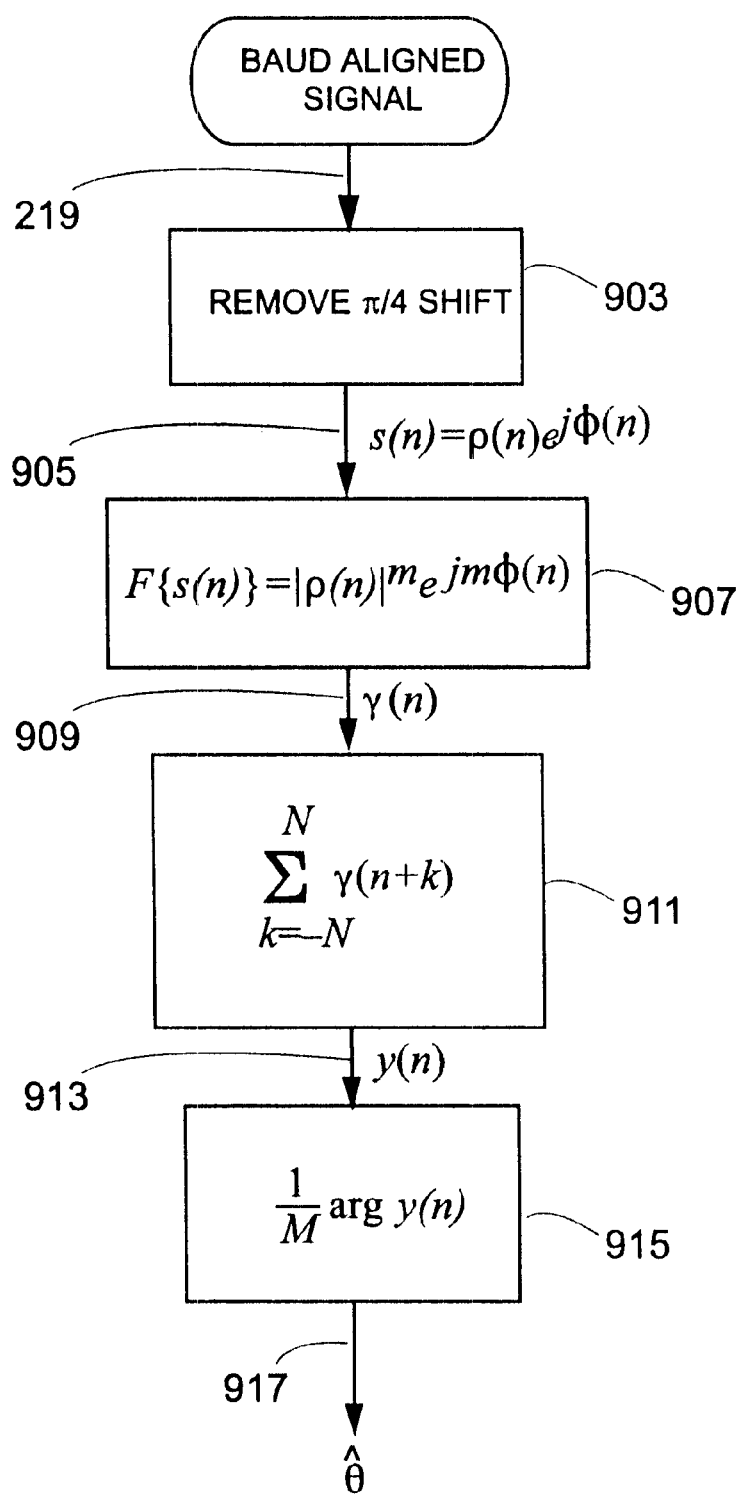
FIG. 9 is a flow chart of the Viterbi and Viterbi frequency offset compensation method used in one embodiment of the second version of the system of FIG. 2.

Viterbi and Viterbi, "Nonlinear estimation of PSK-modulated carrier phase with application to burst digital transmission," *IEEE Trans. on Information Theory*, Vol. IT-29, No. 4, pp. 543–551, July 1983, compares using different nonlinearities, m=1, 2 and 4 in such a method. m=2 is used in the preferred implementation. After the nonlinear operation, the frequency estimation or the phase tracking can be done in different ways. One method is proposed in the Viterbi and Viterbi reference and tracks the phase trajectory directly after the nonlinear operation. A version of this method is shown in the flow chart of FIG. 9. Starting with the baud aligned signal 219, the π/4 rotation of every second symbol is carried out in step 903 (e.g, by multiplying by 1+j). The nonlinear function is then applied in step 907 to generate γ(n). The basis of the method is that the carrier phase estimate denoted θ̂ is determined as $$\hat{\theta}=\frac{1}{M}\arg\left(\sum_{k=-N'}^{k=N'}\gamma(n+k)\right),$$

where the summation is over 2N'+1 samples and centered on the current (say nth) sample. The summation is thus an averaging operation over 2N'+1 samples. Thus, in step 911, the moving average 913 denoted y(n) is obtained, this moving average being of all the complex samples in a window of 2N'+1 samples centered around the sample n. The last step 915 determines $$\frac{1}{M} \arg\left(\sum_{k=-N'}^{k=N'} \gamma(n+k)\right)$$

and is equivalent to taking an arctangent operation and diving by 1/M. For non-differentially encoded data, this in theory gives an M-fold ambiguity in the phase estimate, which is avoided when differential encoding is used.

Figure 10:
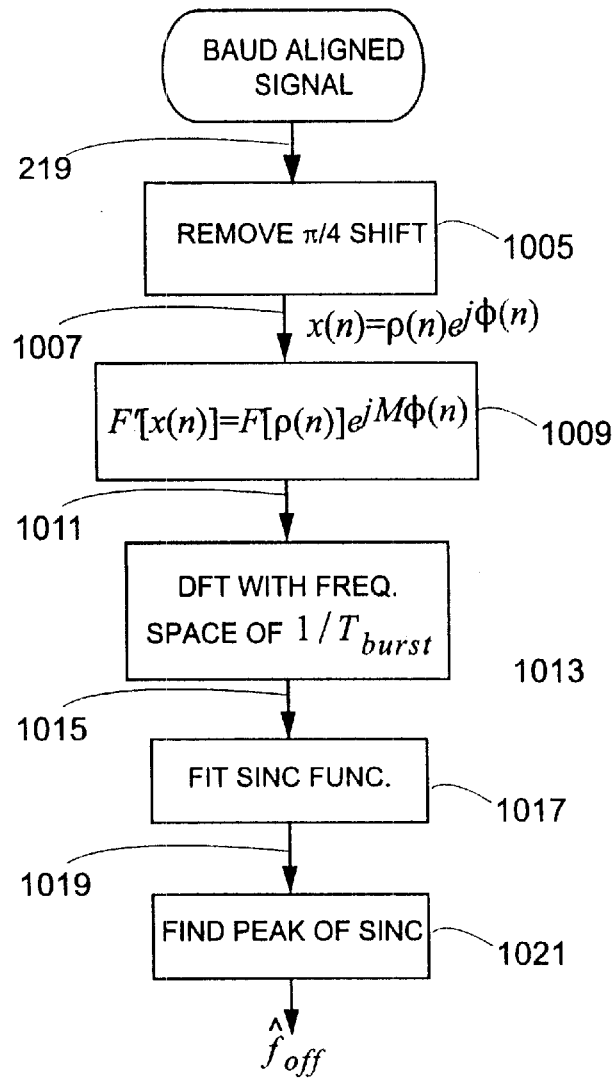
FIG. 10 is a flow chart of the Maximum Likelihood DFT-based frequency offset compensation method used in another embodiment of the second version of the system of FIG. 2.

The preferred frequency offset estimation method is based on a Discrete Fourier Transform (DFT). This method estimates the frequency offset and constructs a phase for tracking. The method works best when the frequency offset in the received signal is substantially constant over a single burst. The method is summarized by the flow chart of FIG. 10. In step 1005, every other symbol of the time aligned copy signal 219 is first rotated in phase by π/4 (e.g, by multiplying by 1+j). The nonlinear operation is then applied in step 1009. The resulting signal 1011 has a regenerated sinusoid at M times the frequency offset for M-PSK modulation. Thus, in the preferred embodiment using DQPSK, this would be a four times the frequency offset. Thus, the DFT of a block of N samples, in the absence of noise, after the nonlinear operation will have a sinc pulse centered at M-times the frequency offset for M-PSK. Thus, in the preferred embodiment, a DFT operation is carried out on the nonlinearly transformed signal 1011 in step 1013, this DFT calculated with a frequency interval of $T_{burst}$, where $T_{burst}$ is the burst duration. The number of DFT coefficients depends on the search range of the frequencies. To scan a frequency range of +2 kHz to −2 kHz (not in the fourth power domain), the method should use six DFT coefficients to be calculated for a burst length of 120 symbols. The number of DFT coefficients scales directly with the search range and the length of the burst. In step 1017, a finely sampled sinc function with a period of $T_{burst}$ is fit to DFT coefficients 1015. The fit may be accomplished various ways. In our implementation, sampled sinc functions having various shifts are correlated with the DFT coefficients. The sinc function shift producing the maximum correlation peak is determined in step 1021. The shift producing the correlation peak corresponds to four times the frequency offset. With the coherent demodulator, initial phase needs to be determined, and for this, a complex sinusoid is generated with the frequency being that of the estimated frequency offset. This is correlated with the input to extract the initial phase.

Figure 7:
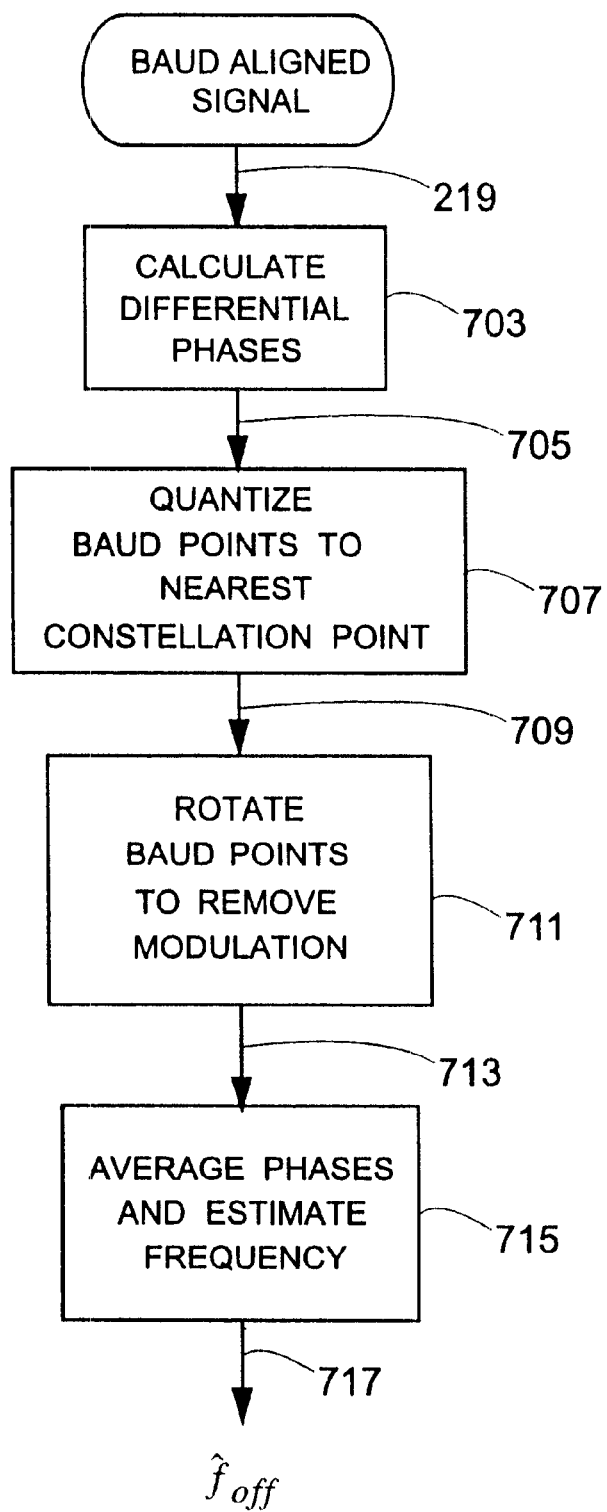
FIG. 7 is a flow chart of the frequency offset estimation method used in the preferred embodiment of the first version of the system of FIG. 2.

The DFT-based frequency estimator was found to perform much better than the system of FIG. 7. At a signal-to-noise ratio of 15 dB, the standard deviation of the DFT-based frequency estimator was 16.73 Hz, while that of the estimator of FIG. 7, 134.16 dB.

Coherent Demodulation

The above described demodulation methods for a signal that has been differentially encoded (e.g., using π/4-DQPSK) use differential demodulation in that changes in phase from one symbol to the other are used for the decision, with correction added for tracking.

Figure 11:
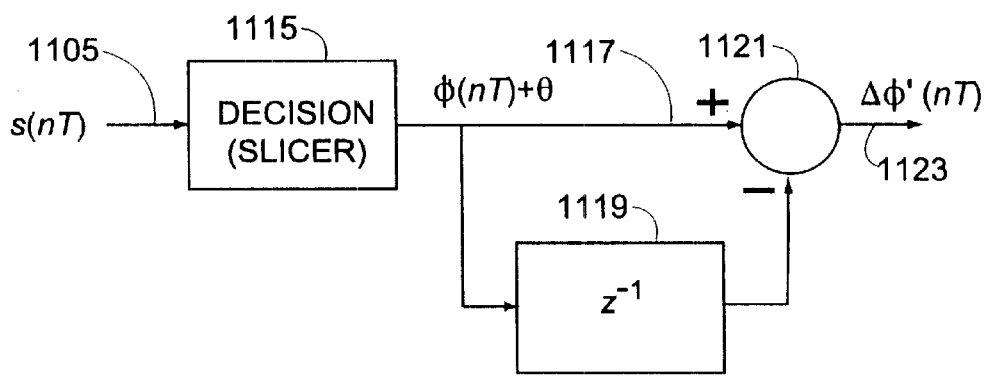
FIG. 11 is a block diagram showing a coherent demodulation scheme as used in one of the embodiments.

A coherent demodulation scheme does not simply look at phase differences symbol to symbol, but rather attempts to learn and track the absolute phase of the received signal as illustrated in FIG. 11. Note again that as used herein, the term demodulation includes detection, thus the architecture of FIG. 11 may sometimes be called coherent detection. Suppose the input signal samples to the demodulator are $$s(nT)=\exp-j[\Phi(nT)+\theta(nT)]+v(nT).$$

where $\Phi(nT)$ is the symbol phase at time nT, n is a time index, T is the sampling (and preferably symbol) period, v(nT) is complex valued additive noise and θ(nT) is some unknown phase rotation (the ambiguity). For the coherent demodulator, we can assume that the frequency estimation is accurate so that we accurately track, and thus we can assume that ideally the phase rotation ambiguity $\theta(nT_s)=\theta$ where θ assumes certain discrete phases (e.g., any multiple of π/4 for the case of π/4 DQPSK) that allow a slicer to work properly. As seen in FIG. 11, input 1105 denoted $s(nT_s)$ is applied to a conventional slicer 1115 designed for the phases of $\Phi(nT_s)$, and it is assumed that the slicer estimates $\Phi(nT_s)+\theta$. After the slicer, a difference operation 1121 with a unit delay 1119 forms an estimate 1123 $\neq \Phi'(nT_s)$, independent of $\theta(nT_s)$, that directly represents the information bits.

Because the coherent demodulator described herein requires tracking the channel phase so that the input is frequency offset corrected, which is a challenge in high mobility systems, the coherent demodulator described herein is preferably used for the wireless local loop systems where the subscriber units are fixed. For mobile systems, the tracking demodulator of FIG. 4 is preferred.

We expect that in a channel that can be modeled as an additive Gaussian white noise channel, in order to maintain a BER of $10^{-3}$, a coherent demodulator should perform approximately 1dB better than demodulator of FIG. 4, with a zero-order filter consisting of multiplication by 0.5.

Other Implementations

Referring for example to the architecture of FIG. 2, the scope of this invention includes combining one or more of blocks 217, 221, 225, 231, and 241. Consider first combining all these blocks. In such a case, the invention includes estimating from the copy signal 215 a reference signal 245 having the same modulation scheme as the transmitted signal and the substantially the same frequency offset and timing misalignment as the received signals 211, the estimating using the known finite alphabet modulation scheme of the transmitted signal. Another aspect is using the frequency offset and timing alignment adjusted reference signal 245 and received signals 211 to determine the receive weights 239.

As one example, blocks 217, 221, and 225 can be combined by performing a joint optimization over timing, frequency, offset, and symbols to minimize the deviations from the known finite symbol alphabet of the modulated signal. Many methods known in the art may be adapted to performing this optimization efficiently. One method for example is described in Ascheid, Oerder, Stahl and Meyer: "An all digital receiver architecture for bandwidth efficient transmission at high data rates, *IEEE Transactions on Communications*, vol. 37, no. 8, pp. 804–813, August 1989, and includes combining a grid search over the parameter space with a descent method. Alternatively, one may use an extended Kalman filter to track the evolution of timing, frequency, and phase during the course of transmission. See for example, Itlis and Fuxjaeger: "A digital DS spread spectrum receiver with joint channel and Doppler shift estimation," *IEEE Transactions of Communications*, vol. 39, no. 8, pp. 1255–1267, August 1991, for a description of an extended Kalman filter which may be modified to be used in the present invention.

If the sequence transmitted to the communications station includes error protection, for example in the form of parity symbols, error correction can be included in the reference signal generation to ensure that the ideal signal has valid parity.

As will be understood by those skilled in the art, the skilled practitioner may make many changes in the methods and apparatuses as described above without departing from the spirit and scope of the invention. For example, the communication station in which the method is implemented may use one of many protocols. In addition, several architectures of these stations are possible. Also, the architectures described produce reference signals that consist of on-baud samples. It would be clear to one of ordinary skill in the art how to modify the embodiments to produce reference signal samples that are off baud points, and that include on-baud and off-baud samples. Many more variations are possible. The true spirit and scope of the invention should be limited only as set forth in the claims that follow.

What is claimed is:

1. A method for producing a reference signal from a modulated signal, comprising:

weighting a set of received antenna signals to form a copy signal corresponding to a remote station, the weighting using a spatial weight vector corresponding to the remote station, the copy signal being in the form of copy signal samples; and determining samples of the reference signal by, for each of a set of sample points:

constructing an ideal signal sample from the copy signal at the same sample point, the ideal signal sample having a phase determined from the copy signal at the sample point, with the phase of the ideal signal sample at an initial symbol point set to be an initial ideal signal phase;

relaxing the phase of the ideal signal sample towards the copy signal sample phase to produce the phase of the reference signal; and producing the reference signal having the phase of the reference signal produced by relaxing the phase of the ideal signal towards the copy signal sample phase.

2. The method in claim 1 wherein the spatial weight vector is determined from the received antenna signals and from the reference signal.

3. The method in claim 1 wherein the set of received antenna signals is received at a communications station, the communications station including an array of antennas and a spatial processor.

4. The method in claim 3 wherein the spatial processor includes mechanisms for weighting the set of received antenna signals by a set of corresponding receive weights.

5. The method in claim 4 wherein each distinct received antenna signal is derived from the signal received at a corresponding antenna of the array.

6. The method in claim 1 wherein the modulated signal is modulated at symbol points by a modulation scheme that has a finite symbol alphabet.

7. The method in claim 6 wherein the finite symbol alphabet includes symbols that have different phases.

8. The method of claim 1 wherein the phase of the ideal signal is determined in constructing an ideal signal sample from the copy signal at the same sample point, sample by sample, the phase of the ideal signal sample at any sample point being determined from the phase of the reference signal at the previous sample point for which said phase is determined, and from a decision based on the copy signal.

9. The method of claim 1 wherein the initial symbol point is a first valid symbol point in a burst of samples of received antenna signals, and determining samples of the reference signal comprises determining the samples of the reference signal in the forward time direction.

10. The method of claim 1 wherein the initial symbol point is the last valid symbol point in a burst of samples of received antenna signals, and determining samples of the reference signal comprises determining the samples of the reference signal in the backwards time direction.

11. The method of claim 1 wherein relaxing the phase of the ideal signal sample towards the phase of the copy signal sample corresponds to adding a filtered version of the difference between the copy signal phase and ideal signal phase.

12. The method of claim 1 wherein relaxing the phase of the ideal signal sample towards the phase of the copy signal sample corresponds to forming the reference signal sample by adding to the ideal signal sample a filtered version of the difference between the copy signal and ideal signal.

13. The method of claim 11 wherein the filter is a zero order filter consisting of multiplication by a constant and wherein the phase of the reference signal sample is equal to the phase of the ideal signal added to the multiplication of the difference between the phases of the copy signal sample and the ideal signal sample with a constant.

14. The method of claim 11 wherein the filter is a linear discrete time filter with a transfer function denoted H(z) in the Z-domain with input to the filter being the difference between the phases of the copy signal sample and the ideal signal sample.

15. The method of claim 13 wherein the quantity of the difference between the phases of the copy signal sample and the ideal signal sample is phase unwrapped.

16. The method of claim 13 wherein the quantity of the difference between the phases of the copy signal sample and the ideal signal sample is constrained to be in the range $-\pi$ to $+\pi$.

17. The method of claim 14 wherein the quantity of the difference between the phases of the copy signal sample and the ideal signal sample is phase unwrapped.

18. The method of claim 14 wherein the quantity of the difference between the phases of the copy signal sample and the ideal signal sample is constrained to be in the range $-\pi$ to $+\pi$.

19. The method of claim 12 wherein the filter is a zero order filter consisting of multiplication by a constant so that the reference signal sample is equal to the ideal signal added to the multiplication of the difference between the copy signal sample and the ideal signal sample with a constant.

20. The method of claim 12 wherein the filter is a linear discrete time filter with a transfer function denoted H(z) in the Z-domain with input to the filter being the difference between the copy signal sample and the ideal signal sample.

21. The method of claim 14 wherein the filter is a first order filter having a transfer function $$H(z) = \frac{\gamma + \beta z^{-1}}{1 - \delta z^{-1}}$$

where $\gamma$, $\beta$, and $\delta$ are parameters.

22. The method of claim 20 wherein the filter is a first order filter having a transfer function $$H(z) = \frac{\gamma + \beta z^{-1}}{1 - \delta z^{-1}}$$

where $\gamma$, $\beta$, and $\delta$ are parameters.

23. The method of claim 13 further comprising correcting the phase of the reference signal sample by an amount dependent on the difference in phase between the previously determined reference signal sample and the previously determined copy signal sample prior to producing the reference signal.

24. The method of claim 19 further comprising correcting the phase of the reference signal sample by an amount dependent on the difference between the previously determined reference signal sample and the previously determined copy signal sample prior to producing the reference signal.

25. The method of claim 6 wherein the modulation scheme is phase shift keying.

26. The method of claim 25 wherein the modulation scheme is differential phase shift keying.

27. The method of claim 6 wherein the modulation scheme is quadrature amplitude modulation, hereafter QAM.

28. A method, comprising:
   separating from a set of received antenna signals a copy signal corresponding to a remote station by using a first spatial weight vector corresponding to the remote station;
   determining from the copy signal a reference signal; and
   computing a second spatial weight vector by optimizing a cost function, the cost function using the received antenna signals and the reference signal.

29. The method in claim 28 wherein the set of received antenna signals is received at a communications station, the communications station including an array of antennas and a spatial processor.

30. The method in claim 29 wherein the spatial processor includes mechanisms for weighting the set of received antenna signals by a set of corresponding receive weights.

31. The method in claim 30 wherein each distinct received antenna signal is derived from the signal received at a corresponding antenna of the array.

32. The method in claim 28 wherein the set of received antenna signals includes a modulated signal transmitted from the remote station, the modulated signal modulated at symbol points by a modulation scheme that has a finite symbol alphabet.

33. The method in claim 32 wherein the finite symbol alphabet includes symbols that have different phases.

34. The method of claim 28 wherein the reference signal has substantially the same frequency offset and time alignment as the received antenna signals.

35. The method of claim 28, wherein the set of received antenna signals includes a modulated signal transmitted from the remote station, the modulated signal modulated at symbol points by a modulation scheme that has a finite symbol alphabet, the method further including extracting the symbols of the modulated signal.

36. The method of claim 28 further including performing timing alignment on the received antenna signals prior to separating from the received antenna signals the copy signal.

37. The method of claim 28 further including performing frequency offset correction on the received antenna signals prior to separating from the received antenna signals the copy signal.

38. The method of claim 36 further including performing frequency offset correction on the received antenna signals prior to separating from the received antenna signals the copy signal.

39. The method of claim 28 further comprising separating from the received antenna signals the copy signal at least once, using the second spatial weight vector previously computed instead of the first spatial weight vector.

40. The method of claim 28 further comprising repeating, at least once, determining from the copy signal the reference signal.

41. The method of claim 28 further including:
   estimating a frequency offset and a timing misalignment of the copy signal; and
   correcting the copy signal for frequency offset and timing misalignment to form a corrected copy signal,
   wherein determining from the copy signal the reference signal comprises:
      synthesizing a corrected reference signal that has substantially the same frequency offset and timing alignment as the corrected copy signal; and
      applying frequency offset and time misalignment to the corrected reference signal to form a frequency offset and time misaligned reference signal having the same frequency offset and time misalignment as the received antenna signals.

42. The method of claim 28 further including:
   estimating a timing misalignment of the copy signal; and
   correcting the copy signal for timing misalignment to form a timing aligned copy signal,
   wherein determining from the copy signal the reference signal comprises:
      synthesizing a timing aligned reference signal that has substantially the same timing alignment as the timing-aligned copy signal; and
      applying time misalignment to the timing aligned reference signal to form a timing misaligned reference signal having substantially the same time alignment as the received antenna signals.

43. The method of claim 28 further including:
   estimating the frequency offset of the copy signal, and
   correcting the copy signal for frequency offset to form a frequency offset corrected copy signal,
   wherein determining from the copy signal the reference signal comprises:
      synthesizing a frequency offset corrected reference signal that has substantially the same frequency offset as the frequency offset corrected copy signal; and
      applying frequency offset to the frequency offset corrected reference signal to form a frequency offset reference signal having substantially the same frequency offset as the received antenna signals.

44. The method of claim 28 wherein determining from the copy signal the reference signal includes, for each of a set of sample points:
   constructing an ideal signal sample from the copy signal at the same sample point, the ideal signal sample having a phase determined from the copy signal at the sample point, with the phase of the ideal signal sample at an initial symbol point set to be an initial ideal signal phase;
   relaxing the phase of the ideal signal sample towards the copy signal sample phase to produce the phase of the reference signal; and
   producing the reference signal having the phase of the reference signal produced by relaxing the phase of the ideal signal towards the copy signal sample phase.

45. The method of claim 44 wherein the phase of an ideal signal is determined in constructing an ideal signal sample from the copy signal at the same sample point, sample by sample, the phase of the ideal signal sample at any sample point being determined from the phase of the reference signal at the previous sample point for which said phase is determined, and from a decision based on the copy signal.

46. The method of claim 44 wherein relaxing the phase of the ideal signal sample towards the phase of the copy signal corresponds to adding a filtered version of the difference between the copy signal phase and ideal signal phase.

47. The method of claim 44 wherein relaxing the phase of the ideal signal sample towards the phase of the copy signal corresponds to forming the reference signal sample by adding to the ideal signal sample a filtered version of the difference between the copy signal and ideal signal.

48. The method of claim 43 wherein synthesizing the frequency offset corrected reference signal includes, for each of a set of sample points:
   constructing an ideal signal sample from the frequency offset corrected copy signal at the same sample point, the ideal signal sample having a phase determined from the frequency offset corrected copy signal at the sample point, with the phase of the ideal signal sample at an initial symbol point set to be an initial ideal signal phase;
   relaxing the phase of the ideal signal sample towards the frequency offset corrected copy signal sample phase to produce the phase of the frequency offset corrected reference signal; and
   producing the frequency offset corrected reference signal having the phase of the frequency offset corrected reference signal produced by relaxing the phase of the ideal signal towards the frequency offset copy signal sample phase.

49. The method of claim 48 wherein the phase of the ideal signal is determined in constructing an ideal signal sample from the frequency offset corrected copy signal at the same sample point, sample by sample, the phase of the ideal signal sample at any sample point being determined from the phase of the frequency offset corrected reference signal at the previous sample point for which said phase is determined, and from a decision based on the frequency offset corrected copy signal.

50. The method of claim 48 wherein relaxing the phase of the ideal signal sample towards the phase of the frequency offset corrected copy signal corresponds to adding a filtered version of the difference between the frequency offset corrected copy signal phase and ideal signal phase.

51. The method of claim 48 wherein relaxing the phase of the ideal signal sample towards the phase of the frequency offset corrected copy signal corresponds to forming the reference signal sample by adding to the ideal signal sample a filtered version of the difference between the frequency offset corrected copy signal and ideal signal.

52. The method of claim 42 wherein synthesizing the timing aligned reference signal includes, for each of a set of sample points:
   constructing an ideal signal sample from the timing aligned copy signal at the same sample point, the ideal signal sample having a phase determined from the timing aligned copy signal at the sample point, with the phase of the ideal signal sample at an initial symbol point set to be an initial ideal signal phase;
   relaxing the phase of the ideal signal sample towards the timing aligned copy signal sample phase to produce the phase of the timing aligned reference signal; and
   producing the timing aligned reference signal having the phase of the timing aligned reference signal produced by relaxing the phase of the ideal signal sample towards the timing aligned copy signal sample phase.

53. The method of claim 52 wherein the phase of the ideal signal is determined in constructing an ideal signal sample from the timing aligned copy signal at the same sample point, sample by sample, the phase of the ideal signal sample at any sample point being determined from the phase of the timing aligned reference signal at the previous sample point for which said phase is determined, and from a decision based on the timing aligned copy signal.

54. The method of claim 52 wherein relaxing the phase of the ideal signal sample towards the phase of the timing aligned copy signal corresponds to adding a filtered version of the difference between the timing aligned copy signal phase and ideal signal phase.

55. The method of claim 52 wherein relaxing the phase of the ideal signal sample towards the phase of the timing aligned copy signal corresponds to forming the reference signal sample by adding to the ideal signal sample a filtered version of the difference between the timing aligned copy signal and ideal signal.

56. The method of claim 41 wherein synthesizing the corrected reference signal includes:
   coherently demodulating the corrected copy signal to form signal symbols; and
   re-modulating the signal symbols to form the corrected reference signal having substantially the same timing alignment and frequency offset as the corrected copy signal.

57. The method of claim 43 wherein synthesizing the frequency offset corrected reference signal includes:
   coherently demodulating the frequency offset corrected copy signal to form signal symbols; and
   re-modulating the signal symbols to form the frequency offset corrected reference signal having substantially the same frequency offset as the frequency offset corrected copy signal.

58. The method of claim 41 wherein estimating the frequency offset includes:
   applying a nonlinearity to a set of samples determined from the copy signal;
   taking a DFT; and
   determining the shift that when applied to an interpolation function causes the shifted interpolation function to best fit the DFT result, the resulting determined shift being a multiple of the estimated frequency offset.

59. The method of claim 43 wherein estimating the frequency offset includes:
   applying a nonlinearity to a set of samples determined from the copy signal;
   taking a DFT; and
   determining the shift that when applied to an interpolation function causes the shifted interpolation function to best fit the DFT result, the resulting determined shift being a multiple of the estimated frequency offset.

60. An apparatus comprising:
   a spatial processor coupled to a weight formation processor to separate a copy signal corresponding to a remote station from a set of received antenna signals using a first spatial weight vector;
   a reference signal generator coupled to the spatial processor to determine a reference signal from the copy signal;
   the weight formation processor coupled to the reference signal generator to provide the first spatial weight vector and to compute a second spatial weight vector using the received signal corresponding to the remote station and the reference signal.

61. The apparatus in claim 60 wherein the apparatus is a communications station, the communications station further including an array of antennas.

62. The apparatus in claim 60 wherein the spatial processor weighs the set of received antenna signals by a set of corresponding receive weights.

63. The apparatus in claim 60 wherein the determined reference signal has substantially the same frequency offset and time alignment as the received antenna signals.

64. The apparatus in claim 60 further including a timing alignment processor coupled to the spatial processor and weight formation processor to perform timing alignment on the received antenna signals, said spatial processor and weight formation processor using the time aligned received antenna signals.

65. The apparatus in claim 60 further including a frequency offset correction processor coupled to the spatial processor and weight formation processor to perform frequency offset correction on the received antenna signals, said spatial processor and weight formation processor using the frequency-offset corrected received antenna signals.

66. The apparatus in claim 64 further including a frequency offset correction processor coupled to the spatial processor and weight formation processor to perform frequency offset correction on the received antenna signals, said spatial processor and weight formation processor using the frequency-offset corrected received antenna signals.

67. An apparatus comprising:
a means for separating a copy signal corresponding to a particular remote station from a set of received antenna signals using a spatial weight vector;
a means for generating a reference signal from the copy signal; and
a means for generating the spatial weight vector using the received signal corresponding to a particular remote station and the reference signal.

68. The apparatus in claim 67 further including a means for aligning the timing of the received antenna signals.

69. The apparatus in claim 67 further including a means for correcting the frequency offset of the received antenna signals.

70. The apparatus in claim 68 further including a means for correcting the frequency offset of the received antenna signals.

71. An article of manufacture, comprising:
a machine accessible medium, the machine accessible medium providing instructions that, when executed by a machine, cause the machine to generate a reference signal from a modulated signal by:
separating from the received antenna signals a copy signal corresponding to the particular remote station by using an initial spatial weight vector corresponding to the particular remote station;
determining from the copy signal a reference signal; and
computing a new spatial weight vector by optimizing a cost function, the cost function using the received antenna signals and the reference signal.

72. The article of claim 71, wherein the instructions that, when executed, further cause the machine to extract the symbols of the modulated signal.

73. The article of claim 71, wherein the instructions that, when executed, further cause the machine to perform timing alignment on the received antenna signals prior to separating from the received antenna signals the copy signal.

74. The article of claim 71, wherein the instructions that, when executed, further cause the machine to perform frequency offset correction on the received antenna signals prior to separating from the received antenna signals the copy signal.

75. The article of claim 73, wherein the instructions that, when executed, further cause the machine to perform frequency offset correction on the received antenna signals prior to separating from the received antenna signals the copy signal.

76. The article of claim 71, wherein the instructions that, when executed, further cause the machine to repeat separating from the received antenna signals a copy signal at least once, using the second new spatial weight vector previously computed instead of the initial spatial weight vector.

77. The article of claim 71, wherein the instructions that, when executed, further cause the machine to repeat, at least once, determining from the copy signal the reference signal.

78. The article of claim 71, wherein the instructions that, when executed, further cause the machine to:
estimate a frequency offset and a timing misalignment of the copy signal; and
correct the copy signal for frequency offset and timing misalignment to form a corrected copy signal,
and wherein the instructions that, when executed, cause the machine to determine from a copy signal the reference signal further include instructions that, when executed, cause the machine to:
synthesize a corrected reference signal that has substantially the same frequency offset and timing alignment as the corrected copy signal; and
apply a frequency offset and time misalignment to the corrected reference signal to form a frequency offset and time misaligned reference signal having the same frequency offset and time misalignment as the received antenna signals.

79. The article of claim 71, wherein the instructions that, when executed, further cause the machine to:
estimate a timing misalignment of the copy signal; and
correct the copy signal for timing misalignment to form a timing aligned copy signal,
and wherein the instructions that, when executed, cause the machine to determine from a copy signal the reference signal further include instructions that, when executed, cause the machine to:
synthesize a timing aligned reference signal that has substantially the same timing alignment as the timing-aligned copy signal; and
apply a time misalignment to the timing aligned reference signal to form a timing misaligned reference signal having substantially the same time alignment as the received antenna signals.

80. The article of claim 71, wherein the instructions that, when executed, further cause the machine to:
estimate the frequency offset of the copy signal, and
correct the copy signal for frequency offset to form a frequency offset corrected copy signal,
and wherein the instructions that, when executed, cause the machine to determine from a copy signal the reference signal further include instructions that, when executed, cause the machine to:
synthesize a frequency offset corrected reference signal that has substantially the same frequency offset as the frequency offset corrected copy signal; and
apply a frequency offset to the frequency offset corrected reference signal to form a frequency offset reference signal having substantially the same frequency offset as the received antenna signals.

81. The article of claim 71, wherein the instructions that, when executed, further cause the machine to determine the reference signal for each of a set of sample points by:

constructing an ideal signal sample from the copy signal at the same sample point, the ideal signal sample having a phase determined from the copy signal at the sample point, with the phase of the ideal signal sample at an initial symbol point set to be an initial ideal signal phase;

relaxing the phase of the ideal signal sample towards the copy signal sample phase to produce the phase of the reference signal; and producing the reference signal having the phase of the reference signal produced by relaxing the phase of the ideal signal sample towards the copy signal sample phase.

82. The article of claim 81, wherein the instructions that, when executed, further cause the machine, in constructing an ideal signal sample from the copy signal at the same sample point, to determine sample by sample, the phase of the ideal signal sample at any sample point from the phase of the reference signal at the previous sample point for which said phase is determined and a decision based on the copy signal.

83. The article of claim 81, wherein the instructions that, when executed, cause the machine to relax the phase of the ideal signal sample towards the phase of the copy signal, comprise instructions that, when executed, cause the machine to add a filtered version of the difference between the copy signal phase and ideal signal phase.

84. The article of claim 81, wherein the instructions, when executed, further cause the machine to relax the phase of the ideal signal sample towards the phase of the copy signal by adding to the ideal signal sample a filtered version of the difference between the copy signal and ideal signal to form the reference signal sample.

85. The article of claim 80, wherein the instructions that, when executed, further cause the machine to:
construct an ideal signal sample from the frequency offset corrected copy signal at the same sample point, the ideal signal sample having a phase determined from the frequency offset corrected copy signal at the sample point, with the phase of the ideal signal sample at an initial symbol point set to be an initial ideal signal phase;
relax the phase of the ideal signal sample towards the frequency offset corrected copy signal sample phase to produce the phase of the frequency offset corrected reference signal; and
produce the frequency offset corrected reference signal having the phase of the frequency offset corrected reference signal produced by relaxing the phase of the ideal signal sample towards the frequency offset corrected copy signal.

86. The article of claim 85, wherein the instructions that, when executed, further cause the machine, in constructing an ideal signal sample from the frequency offset corrected copy signal at the same sample point, to determine sample by sample, the phase of the ideal signal sample at any sample point from the phase of the frequency offset corrected reference signal at the previous sample point for which said phase is determined and a decision based on the frequency offset corrected copy signal.

87. The article of claim 85, wherein the instructions that, when executed, cause the machine to relax the phase of the ideal signal sample towards the phase of the frequency offset corrected copy signal, comprise instructions that, when executed, cause the machine to add a filtered version of the difference between the frequency offset corrected copy signal phase and ideal signal phase.

88. The article of claim 85, wherein the instructions that, when executed, cause the machine to relax the phase of the ideal signal sample towards the phase of the frequency offset corrected copy signal, comprise instructions that, when executed cause the machine to form the reference signal sample by adding to the ideal signal sample a filtered version of the difference between the frequency offset corrected copy signal and ideal signal.

89. The article of claim 79, wherein the instructions that, when executed, further cause the machine to, for each of a set of sample points:
construct an ideal signal sample from the timing aligned copy signal at the same sample point, the ideal signal sample having a phase determined from the timing aligned copy signal at the sample point, with the phase of the ideal signal sample at an initial symbol point set to be an initial ideal signal phase;
relax the phase of the ideal signal sample towards the timing aligned copy signal sample phase to produce the phase of the timing aligned reference signal; and
produce the timing aligned reference signal having the phase of the timing aligned reference signal produced by relaxing the phase of the ideal signal sample towards the timing aligned copy signal.

90. The article of claim 89, wherein the instructions that, when executed, further cause the machine to, in constructing an ideal signal sample from the timing aligned copy signal at the same sample point, sample by sample, determine the phase of the ideal signal sample at any sample point from the phase of the timing aligned reference signal at the previous sample point for which said phase is determined and a decision based on the timing aligned copy signal.

91. The article of claim 89, wherein the instructions that, when executed, cause the machine to relax the phase of the ideal signal sample towards the phase of the timing aligned copy signal, comprise instructions that, when executed, cause the machine to add a filtered version of the difference between the timing aligned copy signal phase and ideal signal phase.

92. The article of claim 89, wherein the instructions that, when executed, cause the machine, to relax the phase of the ideal signal sample towards the phase of the timing aligned copy signal, comprise instructions that, when executed, cause the machine to form the reference signal sample by adding to the ideal signal sample a filtered version of the difference between the timing aligned copy signal and ideal signal.

93. The article of claim 78, wherein the instructions that, when executed, further cause the machine to:
coherently demodulate the corrected copy signal to form signal symbols; and
re-modulate the signal symbols to form the corrected reference signal having substantially the same timing alignment and frequency offset as the corrected copy signal.

94. The article of claim 80, wherein the instructions, when executed, further cause the machine to:
coherently demodulate the frequency offset corrected copy signal to form signal symbols; and
re-modulate the signal symbols to form the frequency offset corrected reference signal having substantially the same frequency offset as the frequency offset corrected copy signal.

95. The article of claim 78, wherein the instructions that, when executed, further cause the machine to estimate the frequency offset by:

applying a nonlinearity to a set of samples determined from the copy signal;

taking a DFT; and determining the shift that when applied to an interpolation function causes the shifted interpolation function to best fit the DFT result, the resulting determined shift being a multiple of the estimated frequency offset.

96. The article of claim 80, wherein the instructions that, when executed, further cause the machine to estimate the frequency offset by:

applying a nonlinearity to a set of samples determined from the copy signal;

taking a DFT; and determining the shift that when applied to an interpolation function causes the shifted interpolation function to best fit the DFT result, the resulting determined shift being a multiple of the estimated frequency offset.

* * * * *